(12) United States Patent
Gao et al.

(10) Patent No.: US 12,351,175 B2
(45) Date of Patent: Jul. 8, 2025

(54) REVERSING CONTROL METHOD AND SYSTEM AND VEHICLE

(71) Applicant: GREAT WALL MOTOR COMPANY LIMITED, Baoding (CN)

(72) Inventors: Tong Gao, Baoding (CN); Hong Wei, Baoding (CN); Zhichao Fan, Baoding (CN); Bingxu Ma, Baoding (CN); Dongchun Xu, Baoding (CN); Peng Hao, Baoding (CN); Jianzhang Yang, Baoding (CN); Chong Wang, Baoding (CN); Rongchang Xu, Baoding (CN); Jinbiao Bai, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 247 days.

(21) Appl. No.: 17/925,556

(22) PCT Filed: May 24, 2021

(86) PCT No.: PCT/CN2021/095519
§ 371 (c)(1),
(2) Date: Nov. 15, 2022

(87) PCT Pub. No.: WO2021/238863
PCT Pub. Date: Dec. 2, 2021

(65) Prior Publication Data
US 2023/0192086 A1    Jun. 22, 2023

(30) Foreign Application Priority Data
May 25, 2020    (CN) .......................... 202010458179.0

(51) Int. Cl.
*B60W 30/18*    (2012.01)
*B60W 10/06*    (2006.01)
(Continued)

(52) U.S. Cl.
CPC ...... *B60W 30/18036* (2013.01); *B60W 10/06* (2013.01); *B60W 10/11* (2013.01);
(Continued)

(58) Field of Classification Search
CPC .......... B60W 30/18036; B60W 10/06; B60W 10/11; B60W 10/184; B60W 10/20;
(Continued)

(56) References Cited

U.S. PATENT DOCUMENTS

| 2011/0156928 A1 | 6/2011 | Ghisio et al. |
| 2013/0151060 A1* | 6/2013 | Lee .................... B62D 15/0275 701/25 |

(Continued)

FOREIGN PATENT DOCUMENTS

| CN | 103373349 | 10/2013 |
| CN | 104819724 | 8/2015 |

(Continued)

OTHER PUBLICATIONS

M.-W. Xu and S.-H. Pan, "A visual reverse parking system based on trajectory prediction," 2017 IEEE 2nd Information Technology, Networking, Electronic and Automation Control Conference (ITNEC), Chengdu, China, 2017, pp. 717-720. (Year: 2017).*

(Continued)

*Primary Examiner* — Joan T Goodbody
(74) *Attorney, Agent, or Firm* — NIXON PEABODY LLP; Jeffrey L. Costellia

(57) ABSTRACT

A reversing control method and system and a vehicle, which relate to the technical field of vehicles. In the method, after receiving a reversing instruction for a vehicle, a first reversing trajectory of the vehicle can be acquired; the vehicle can be controlled to reverse according to the first reversing trajectory, such that a driver does not need to control the vehicle, thus avoiding tedious operation by the driver;

(Continued)

during a reversing process the first reversing trajectory can be adjusted according to first environmental obstacle information of the vehicle, to acquire a second reversing trajectory; and the vehicle is then controlled to reverse according to the second reversing trajectory. Thus, the danger caused by environmental obstacles during a reversing process may be avoided, and potential safety hazards in process of reversing a vehicle are eliminated.

12 Claims, 13 Drawing Sheets

(51) Int. Cl.
*B60W 10/11* (2012.01)
*B60W 10/184* (2012.01)
*B60W 10/20* (2006.01)
*B62D 15/02* (2006.01)

(52) U.S. Cl.
CPC .......... *B60W 10/184* (2013.01); *B60W 10/20* (2013.01); *B62D 15/0285* (2013.01); *B60W 2420/403* (2013.01); *B60W 2420/54* (2013.01); *B60W 2520/10* (2013.01); *B60W 2554/404* (2020.02); *B60W 2710/0677* (2013.01); *B60W 2710/1005* (2013.01); *B60W 2710/18* (2013.01); *B60W 2710/20* (2013.01)

(58) Field of Classification Search
CPC ....... B60W 2420/403; B60W 2420/54; B60W 2520/10; B60W 2554/404; B60W 2710/0677; B60W 2710/1005; B60W 2710/18; B60W 2710/20; B62D 15/0285; B62D 15/027
See application file for complete search history.

(56) References Cited

U.S. PATENT DOCUMENTS

| 2017/0036695 | A1 | 2/2017 | Lee et al. |
| 2019/0256144 | A1 | 8/2019 | Yamada et al. |

FOREIGN PATENT DOCUMENTS

| CN | 106183992 | | 12/2016 |
| CN | 107169468 | | 9/2017 |
| CN | 108248688 | | 7/2018 |
| CN | 108437981 | | 8/2018 |
| CN | 109709945 | | 5/2019 |
| CN | 110316182 | | 10/2019 |
| CN | 110562244 | | 12/2019 |
| CN | 111674465 | | 9/2020 |
| DE | 10-2017-124661 | | 4/2019 |
| EP | 3524486 | A1 | 8/2019 |
| KR | 10-2021-0025170 | | 3/2012 |
| KR | 10-2016-0056561 | | 5/2016 |

OTHER PUBLICATIONS

Z. Zhang, H. Xu, Z. Chao, X. Li and C. Wang, "A Novel Vehicle Reversing Speed Control Based on Obstacle Detection and Sparse Representation," in IEEE Transactions on Intelligent Transportation Systems, vol. 16, No. 3, pp. 1321-1334, Jun. 2015 (Year: 2015).*
M.-W. Xu and S.-H. Pan, "A visual reverse parking system based on trajectory prediction," 2017 IEEE 2nd Information Technology, Net., Electronic and Auto. Control Conference (ITNEC), Chengdu, China,2017, pp. 717-720 (Year: 2017).*
T. Tashiro, "Vehicle steering control with MPC for target trajectory tracking of autonomous reverse parking," 2013 IEEE International Conference on Control Applications (CCA), Hyderabad, India, 2013, pp. 247-251 (Year: 2013).*
International Search Report for PCT/CN2021/095519 mail Aug. 12, 2021 (6 pages).
First Chinese Office Action for Application No. 202010458179.0 mailed Mar. 18, 2021 (20 pages).
Second Chinese Office Action for Application No. 202010458179.0 mailed Aug. 10, 2021 (26 pages).
Extended European Search Report for App. No. 21813549.9, dated Oct. 30, 2023 (10 pages).

* cited by examiner

REVERSING CONTROL METHOD AND SYSTEM AND VEHICLE

CROSS-REFERENCE TO RELATED APPLICATIONS

This application is a national phase of PCT application No. PCT/CN2021/095519, filed on May 24, 2021, which claims the priority of the Chinese patent application filed on May 25, 2020 before the CNIPA, China National Intellectual Property Administration with the application No. 202010458179.0 and the title of "REVERSING CONTROL METHOD AND SYSTEM AND VEHICLE", which is incorporated herein in its entirety by reference.

TECHNICAL FIELD

The present disclosure relates to the technical field of automobiles, and more particularly, to a reversing control method and a system and a vehicle.

BACKGROUND

In the process of driving a vehicle, when reversing the vehicle, a driver needs to observe obstacles such as the surrounding pedestrians and vehicles while operating the steering wheel to drive the vehicle into a specific position, which is inconvenient to operate; furthermore, driving backward when reversing the vehicle makes the sight line blocked and causes a great safety hazard.

At present, in order to reverse a vehicle safely and efficiently, a reversing radar is usually provided on a vehicle to detect a distance of an obstacle from behind the vehicle, and to give a warning according to the length of the distance, or to collect an image behind the vehicle through a camera on the vehicle and display the image through a head unit of a trip computer near the driving seat of the vehicle, so that the driver can safely reverse the vehicle according to the warning, image, and other information.

However, it is difficult to help the driver to understand the actual distribution of obstacles behind the vehicle by warning the distance of the obstacle. Besides, displaying the rear image information of the vehicle requires the driver to pay attention to the head unit of the trip computer, steering wheel, and the front of the vehicle at the same time, which is inconvenient to operate and has great safety hazards.

SUMMARY

In view of the above, the present disclosure is intended to propose a reversing control method and system and a vehicle for solving the problem of the inconvenience in operation and great safety hazard caused by the obstruction of the driver's sight line and the need to pay attention to the information of a plurality of aspects during the reverse driving of an existing vehicle.

In order to achieve the above object, the technical solutions of the present disclosure are achieved as below.

An embodiment of the present disclosure provides a reversing control method that may include:
acquiring a first reversing trajectory of a vehicle after receiving a reversing instruction for the vehicle;
in response to the reversing instruction, controlling the vehicle to reverse according to the first reversing trajectory;
acquiring first environmental obstacle information of the vehicle in a reversing driving process;
when the first environmental obstacle information reaches a preset condition, determining a second reversing trajectory of the vehicle according to the first reversing trajectory and the first environmental obstacle information; and
controlling the vehicle to reverse according to the second reversing trajectory.

Further, after in response to the reversing instruction, controlling the vehicle to reverse according to the first reversing trajectory, the method further includes
acquiring real-time position information of the vehicle;
when the real-time position information deviates from the first reversing trajectory, determining a third reversing trajectory according to the first reversing trajectory and the real-time position information; and
controlling the vehicle to reverse according to the third reversing trajectory.

Further, when the first environmental obstacle information reaches a preset condition, determining a second reversing trajectory of the vehicle according to the first reversing trajectory and the first environmental obstacle information includes:
determining whether a stationary first obstacle exists in the first environmental obstacle information according to the first reversing trajectory;
when the first obstacle exists, acquiring position information of the first obstacle and the real-time position information of the vehicle; and
determining a second reversing trajectory of the vehicle according to the position information of the first obstacle and the real-time position information of the vehicle such that the vehicle bypasses the first obstacle during reversing.

Further, when the first environmental obstacle information reaches the preset condition, determining a second reversing trajectory of the vehicle according to the first reversing trajectory and the first environmental obstacle information includes:
determining whether a moving second obstacle exists in the first environmental obstacle information according to the first reversing trajectory;
when the second obstacle exists, acquiring obstacle trajectory information of the second obstacle; and
determining a second reversing trajectory of the vehicle according to the obstacle trajectory information and the first reversing trajectory such that there is no overlapping position between the second reversing trajectory and the obstacle trajectory information.

Further, before the after receiving a reversing instruction for a vehicle, acquiring a first reversing trajectory of the vehicle, the method further includes:
when a traveling speed of the vehicle is less than or equal to a first speed, acquiring traveling route information of the vehicle and second environmental obstacle information; and
determining the first reversing trajectory of the vehicle according to the traveling route information and the second environmental obstacle information.

Further, before the after receiving a reversing instruction for a vehicle, acquiring a first reversing trajectory of the vehicle, the method further includes:
clearing the determined first reversing trajectory when the traveling speed of the vehicle is greater than a second speed, the second speed being greater than or equal to the first speed.

Further, before determining a second reversing trajectory of the vehicle according to the position information of the first obstacle and the real-time position information of the vehicle, the method further includes:
  determining whether or not a second reversing trajectory exists according to the position information of the first obstacle and the real-time position information of the vehicle; and
  controlling the vehicle to stop reversing when the second reversing trajectory does not exist.

Further, after in response to the reversing instruction, controlling the vehicle to reverse according to the first reversing trajectory, the method further includes:
  prompting a real-time remaining distance of the first reversing trajectory during a reversing.

Another object of an embodiment of the present disclosure is to provide a reversing control system, which may include:
  a first reversing trajectory acquisition module configured for, acquiring a first reversing trajectory of a vehicle after receiving a reversing instruction for the vehicle;
  a vehicle control module configured for, in response to the reversing instruction, controlling the vehicle to reverse according to the first reversing trajectory;
  an obstacle information acquisition module configured for, acquiring first environmental obstacle information of the vehicle during a reversing driving process; and
  a second reversing trajectory acquisition module configured for, when the first environmental obstacle information reaches a preset condition, determining a second reversing trajectory of the vehicle according to the first reversing trajectory and the first environmental obstacle information; and
  the vehicle control module is further configured for, controlling the vehicle to reverse according to the second reversing trajectory.

Further, in the system, the following are further included:
  a real-time information acquisition module configured for, acquiring the real-time position information of the vehicle; and
  a third reversing trajectory acquisition module configured for, determining a third reversing trajectory according to the first reversing trajectory and the real-time position information when the real-time position information deviates from the first reversing trajectory;
  the vehicle control module is further configured for, controlling the vehicle to reverse according to the third reversing trajectory.

Further, in the system, the second reversing trajectory acquisition module includes:
  a first obstacle sub-module configured for, determining whether a stationary first obstacle exists in the first environmental obstacle information according to the first reversing trajectory;
  a first information sub-module configured for, acquiring the position information of the first obstacle and the real-time position information of the vehicle when the first obstacle exists; and
  a first reversing trajectory sub-module configured for, determining a second reversing trajectory of the vehicle according to the position information of the first obstacle and the real-time position information of the vehicle, such that the vehicle bypasses the first obstacle during reversing.

Further, in the system, the second reversing trajectory acquisition module includes:
  a second obstacle sub-module configured for, determining whether a moving second obstacle exists in the first environmental obstacle information according to the first reversing trajectory;
  a second information sub-module configured for, acquiring obstacle trajectory information of the second obstacle when the second obstacle exists; and
  a second reversing trajectory sub-module configured for, determining the second reversing trajectory of the vehicle according to the obstacle trajectory information and the first reversing trajectory such that there is no overlapping position between the second reversing trajectory and the obstacle trajectory information.

Further, in the system, the obstacle information acquisition module is further configured for, acquiring the traveling route information of the vehicle and the second environmental obstacle information in the case that the traveling speed of the vehicle is less than or equal to the first speed;
  the first reversing trajectory acquisition module is further configured for, determining the first reversing trajectory of the vehicle according to the traveling route information and the second environmental obstacle information.

Further, the first reversing trajectory acquisition module is further configured for, clearing the determined first reversing trajectory if the traveling speed of the vehicle is greater than the second speed, the second speed being greater than or equal to the first speed.

Further, in the system, the second reversing trajectory acquisition module further includes:
  the first reversing trajectory sub-module is further configured for, determining whether a second reversing trajectory exists according to the position information of the first obstacle and the real-time position information of the vehicle; and
  the vehicle control module is further configured for, controlling the vehicle to end reversing when the second reversing trajectory does not exist.

Further, in the system, the following is further included:
  an information prompt module configured for, prompting a real-time remaining distance of the first reversing trajectory during a reversing.

Another object of the present disclosure is to propose a vehicle including a system implementing the reversing control method as described above, or the vehicle includes the reversing control system as described above.

The reversing control method and system and a vehicle of the present disclosure have the following advantages over the prior art:
  after receiving a reversing instruction for a vehicle, a first reversing trajectory of the vehicle can be acquired; the vehicle can be controlled to reverse according to the first reversing trajectory, such that a driver does not need to control the vehicle, thus avoiding tedious operation by the driver; during a reversing process the first reversing trajectory can be adjusted according to first environmental obstacle information of the vehicle, to acquire a second reversing trajectory; and the vehicle is then controlled to reverse according to the second reversing trajectory. Thus, the danger caused by environmental obstacles during a reversing process may be avoided, and potential safety hazards in process of reversing a vehicle are eliminated.

The above description is only an overview of the technical solutions of the present disclosure. In order to understand the technical means of the present disclosure more clearly, the implementation can be made according to the contents of the description. In order to make the above and other purposes, features, and advantages of the present disclosure more obvious and easier to understand, preferred embodiments of the present disclosure are listed below.

BRIEF DESCRIPTION OF THE DRAWINGS

The accompanying drawings constituting a part of the present disclosure are used to provide further understanding of the present disclosure. The schematic embodiments of the present disclosure and descriptions thereof are used to explain the present disclosure and do not constitute an improper limitation of the present disclosure. In the drawings.

DETAILED DESCRIPTION OF THE EMBODIMENTS

Hereinafter, embodiments of the present application will be described in further detail with reference to the accompanying drawings. While embodiments of the present application have been illustrated in the accompanying drawings, it should be understood that the application may be implemented in various forms and should not be limited to the embodiments set forth herein. Rather, these embodiments are provided so that the present application can be more thoroughly understood, and the scope of the present application is fully conveyed to those skilled in the art.

It needs to be noted that embodiments and features of embodiments in the present disclosure may be combined with each other without conflict.

The present disclosure will be described below in detail in connection with embodiments with reference to the accompanying drawings.

Figure 1:
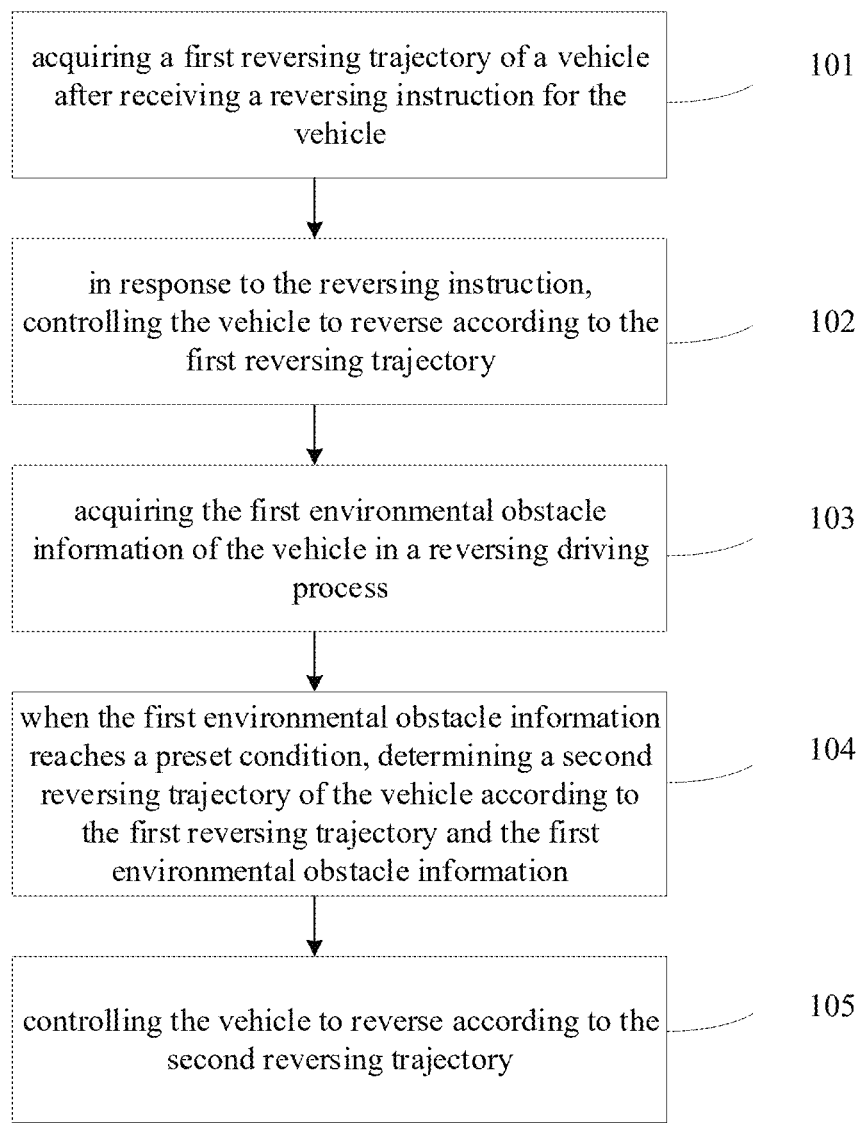
FIG. 1 is a schematic flow chart of a reversing control method proposed in an embodiment of the present disclosure.

Referring to FIG. 1, there is shown a schematic flow chart of a reversing control method provided by an embodiment of the present disclosure, which may include Step 101 to Step 105.

Step 101: acquiring a first reversing trajectory of a vehicle after receiving a reversing instruction for the vehicle.

In an embodiment of the present disclosure, a reversing instruction for a vehicle may be received while the vehicle is traveling. The reversing instruction input by a driver of the current vehicle via a vehicle-mounted computer may be received, or the reversing instruction sent by the driver to at least one vehicle via a third-party electronic device may be received, such as the vehicle is determined to receive the reversing instruction by receiving a click operation of a key such as "automatic reversing" and "reversing assistance" on a head unit of the vehicle-mounted computer by the driver, or receiving the reversing instruction sent by the driver via an electronic device such as a mobile phone, a tablet computer, or a notebook computer. The manner in which the reversing instruction is received is not limited by the embodiments of the present disclosure.

In the embodiments of the present disclosure, the first reversing trajectory of the vehicle may be acquired after receiving the reversing instruction, wherein the first reversing trajectory may be pre-recorded before receiving the reversing instruction, which may be an inverse trajectory of a forward trajectory within a preset time period or a preset distance of the vehicle, or a reversing trajectory planned according to a destination pointed by the reversing instruction when environmental obstacle information of the vehicle is pre-collected. In the case where the first reversing trajectory of the vehicle cannot be acquired, if the first reversing trajectory is not pre-recorded, or the first reversing trajectory cannot be planned due to the lack of current environmental obstacle information, current environmental obstacle information errors, current environmental obstacle information conflicts, and so forth, the information that the reverse assistance cannot be performed may be prompted to the driver via the head unit so that the driver can manually control the vehicle to reverse the vehicle in time, or the environmental obstacle information of the vehicle is re-acquired to plan the first reversing trajectory.

In the embodiment of the disclosure, before acquiring the first reversing trajectory of the vehicle after receiving the reversing instruction, the safety setting of the current vehicle may also be checked, which may include a braking state, a door state, a seat belt state, a rearview mirror state, a steering wheel state, and the like. Optionally, the driver may be prompted to Step on the brake first, and then prompted to check or determine whether the door is closed via a Body Control Module (BCM), whether the safety belt is fastened, whether a steering wheel is released, whether a rearview mirror is closed and so forth. The BCM is an integrated module with a plurality of control functions of the vehicle, such as light control, wiper blade control, door lock control, rearview mirror control, and so forth. At this time, it can be confirmed that the safety setting check is completed by releasing the brake by the drive, it can also be confirmed that the safety setting check is completed by various control functions of the BCM, and it can also be confirmed that the safety setting check is completed by receiving the click operation on a key such as "safety confirmation" and "safety setting completed" on the head unit by the driver. Optionally, the state information of the driver and/or other in-vehicle personnel may also be acquired through a seat belt sensor, a seat pressure sensor, or the like in the vehicle to determine the intention of the driver and/or other in-vehicle personnel so as to determine whether to perform reversing.

Step 102: in response to the reversing instruction, controlling the vehicle to reverse according to the first reversing trajectory.

In an embodiment of the disclosure, after the first reversing trajectory is acquired, the vehicle may be controlled to reverse along the first reversing trajectory in response to the reversing instruction. It may include controlling the driving direction, distance, speed, etc. of the vehicle by controlling the steering wheel angle, gear position, engine power output, and driving state of the vehicle. Optionally, the current steering wheel angle information of the vehicle may be acquired via the Electric Power Steering (EPS) of the vehicle, and a target angle of the steering wheel to steer is controlled; the current gear information of the vehicle can be acquired via the Transmission Control Unit (TCU, an automatic gearbox control unit) of the vehicle, and the vehicle is controlled to switch to a target gear; the current power output of the engine can be acquired via the Engine Control Module (ECM) of the vehicle, and the vehicle is controlled to switch to the target power output; the current driving state of the vehicle, such as vehicle travel distance information, wheel speed pulse information, etc. can be acquired via the Electronic stabilization system (ESP, a vehicle body electronic stabilization system) of the vehicle, and the braking force of each wheel is controlled to adjust the vehicle to the target driving state, and the reversing of the vehicle along the first reversing trajectory is controlled via the cooperation of each component of the vehicle. Wherein the target angle, the target gear, the target power output, and the target driving state are all related to the first reversing trajectory. Those skilled in the art may also control and coordinate various components of the vehicle through other control units, modules, or systems, which will not be specifically limited by the embodiments of the present disclosure.

Step 103: acquiring the first environmental obstacle information of the vehicle in a reversing driving process.

In an embodiment of the present disclosure, various types of sensors, such as an ultrasonic sensor, an image sensor, and the like, mounted on the vehicle may be used to acquire the first environmental obstacle information of the vehicle during the reversing of the vehicle so as to determine a stationary or moving obstacle existing in the driving environment of the vehicle, including the position, shape, size, moving direction, moving speed, and the like of the obstacle. The types of sensors in the embodiment of the present disclosure, and the types and amount of the first environmental obstacle information acquired via the sensor are not limited.

Step 104: when the first environmental obstacle information reaches a preset condition, determining a second reversing trajectory of the vehicle according to the first reversing trajectory and the first environmental obstacle information.

In an embodiment of the present disclosure, since the first reversing trajectory may be pre-recorded before receiving the reversing instruction, which may be the inverse trajectory of the forward trajectory within the preset time period or the preset distance of the vehicle, or it may be the reversing trajectory planned according to the destination pointed by the reversing instruction when environmental obstacle information of the vehicle is pre-collected. Therefore, when the vehicle reverses according to the first reversing trajectory, the influence of an obstacle existing before the reversing instruction is received on the reversing process of the vehicle is small. At this time, when the first environmental obstacle information reaches the preset condition, the second reversing trajectory of the vehicle can be determined according to the first environmental obstacle information and the first reversing trajectory. Optionally, the first reversing trajectory may be corrected according to the first environmental obstacle information, and the corrected first reversing trajectory may be used as the second reversing trajectory.

In an embodiment of the present disclosure, the preset condition may be a degree of change of the first environmental obstacle information in comparison with the environmental obstacle information when the first reversing trajectory is determined. When the degree of change reaches a preset degree of change, the first environmental obstacle information is considered to reach the preset condition. Optionally, the degree of change may be a degree of change in the quantity, position, etc. of newly added or reduced obstacles, or a degree of change in the position and shape of the obstacle, or like conditions, which will not be particularly limited by the embodiments of the present disclosure.

Step 105: controlling the vehicle to reverse according to the second reversing trajectory.

In an embodiment of the present disclosure, the process of controlling the vehicle to reverse according to the second reversing trajectory is similar to the process of Step 102, which will not be repeated herein.

In an embodiment of the present disclosure, after receiving the reversing instruction for the vehicle, the first reversing trajectory of the vehicle can be acquired; the vehicle can be controlled to reverse according to the first reversing trajectory, such that the driver does not need to control the vehicle, thus avoiding tedious operation by the driver. During a reversing process, the first reversing trajectory can be adjusted according to first environmental obstacle information of the vehicle, to acquire the second reversing trajectory; and the vehicle is then controlled to reverse according to the second reversing trajectory. Thus, the danger caused by environmental obstacles during the reversing process may be avoided, and potential safety hazards in process of reversing the vehicle are eliminated.

Figure 2:
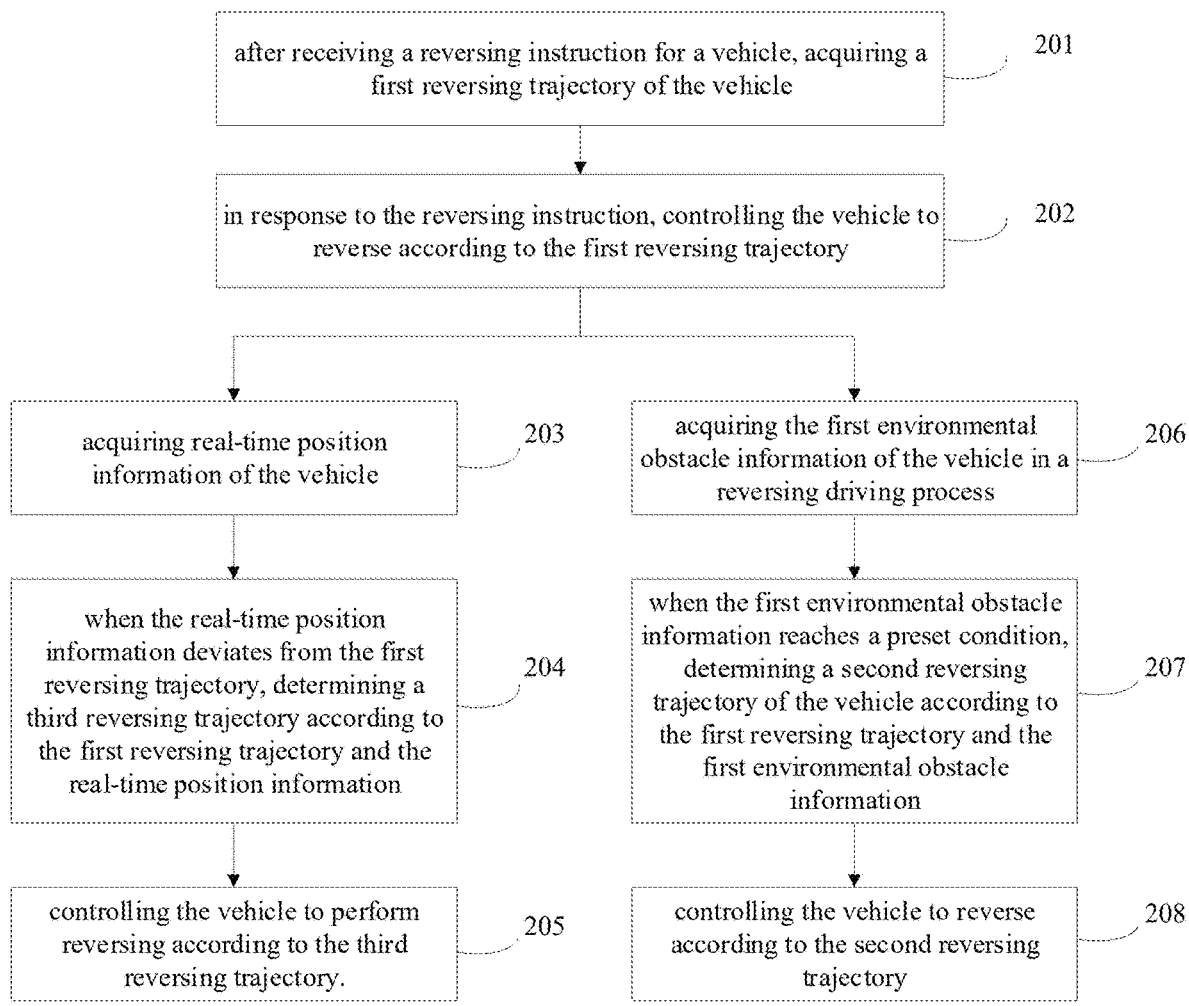
FIG. 2 is a schematic flow chart of another reversing control method proposed in an embodiment of the present disclosure.

FIG. 2 is a schematic flow chart of another reversing control method provided in an embodiment of the present disclosure. As shown in FIG. 2, the method may include:

Step 201: after receiving a reversing instruction for a vehicle, acquiring a first reversing trajectory of the vehicle; and Step 202, in response to the reversing instruction, controlling the vehicle to reverse according to the first reversing trajectory.

In an embodiment of the present disclosure, Step 201 to Step 202 may correspondingly refer to the relevant description of Step 101 to Step 102. In order to avoid repetition, the description will not be repeated herein.

Step 203: acquiring real-time position information of the vehicle.

In an embodiment of the present disclosure, the real-time position information of the vehicle can be acquired when the vehicle reverses according to the first reversing trajectory. Optionally, the real-time position information of the vehicle can be acquired by acquiring the real-time coordinate of the rear axle center, the real-time coordinate of the center of the front shaft, and so forth of the vehicle. The embodiment of the present disclosure does not limit the manner of acquiring the real-time position information of the vehicle.

Step 204: when the real-time position information deviates from the first reversing trajectory, determining a third reversing trajectory according to the first reversing trajectory and the real-time position information.

In an embodiment of the present disclosure, during reversing, the real-time position information of the vehicle may be controlled to approach a coordinate point in the first reversing trajectory, thereby controlling the rotating direction, moving distance and so forth of the vehicle. At this time, an accumulated calculation error may occur, so that an error may exist between the acquired real-time position information and the actual real-time position information of the vehicle; Optionally, after each acquisition of the real-time position information, whether the real-time position information of the vehicle deviates from the first reversing trajectory may be determined, for example, at least one of a position deviation, a direction deviation, and a curvature deviation of the point where the distance between the real-time position information and the first reversing trajectory is the shortest may be calculated, and a deviation degree of the vehicle deviating from the first reversing trajectory may be determined according to the calculation result. When the deviation degree reaches a preset deviation degree, the third reversing trajectory may be determined according to the first reversing trajectory and the real-time position information. For example, a third reversing trajectory that does not coincide with the first reversing trajectory is planned according to the real-time position information, or a corrected trajectory that returns to the first reversing trajectory is planned according to the real-time position information, and a reversing trajectory that returns to the first reversing trajectory from the corrected trajectory, and continues to reverse, is used as the third reversing trajectory.

Figure 3:
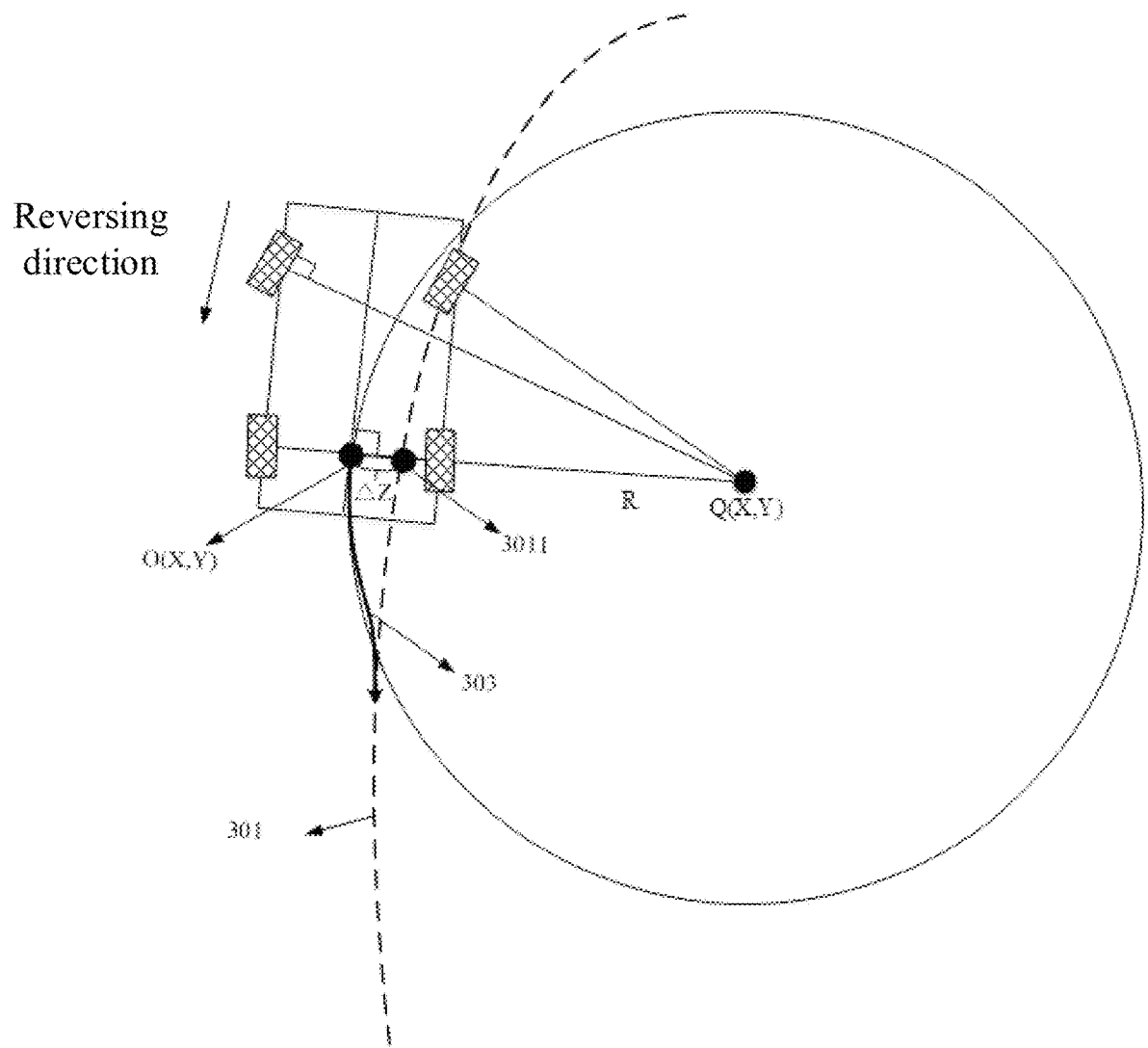
FIG. 3 is a schematic diagram of a calculation method of a vehicle deviation degree provided in an embodiment of the present disclosure.

FIG. 3 is a schematic diagram of a calculation method for the deviation degree of a vehicle in an embodiment of the present disclosure. As shown in FIG. 3, the calculation method includes a first reversing trajectory 301 and a vehicle 302. It can be seen that the coordinate O (X, Y) of the center of a rear axle of the vehicle is the real-time position information 3021 of the vehicle. The coordinate point 3011 is a point on the first reversing trajectory 301 where the distance is the shortest from the real-time position information 3021, and the position deviation is $\Delta Z$, at this moment, the corrected trajectory returning to the first reversing trajectory can be determined according to the real-time position information 3021, and the corrected trajectory to the first reversing trajectory is taken as the third reversing trajectory 303.

Step 205: controlling the vehicle to perform reversing according to the third reversing trajectory.

In an embodiment of the disclosure, as shown in FIG. 3, it is possible to determine the rotation center Q (X, Y) according to the corrected trajectory, so as to calculate the actual curvature radius R of the vehicle, so as to obtain the size of the steering angle of the front wheel of the vehicle. Therefore, according to the transmission ratio relationship of the steering wheel, the target steering angle of the wheel steering is obtained, so as to control the vehicle to reverse according to the third reversing trajectory.

Figure 4:
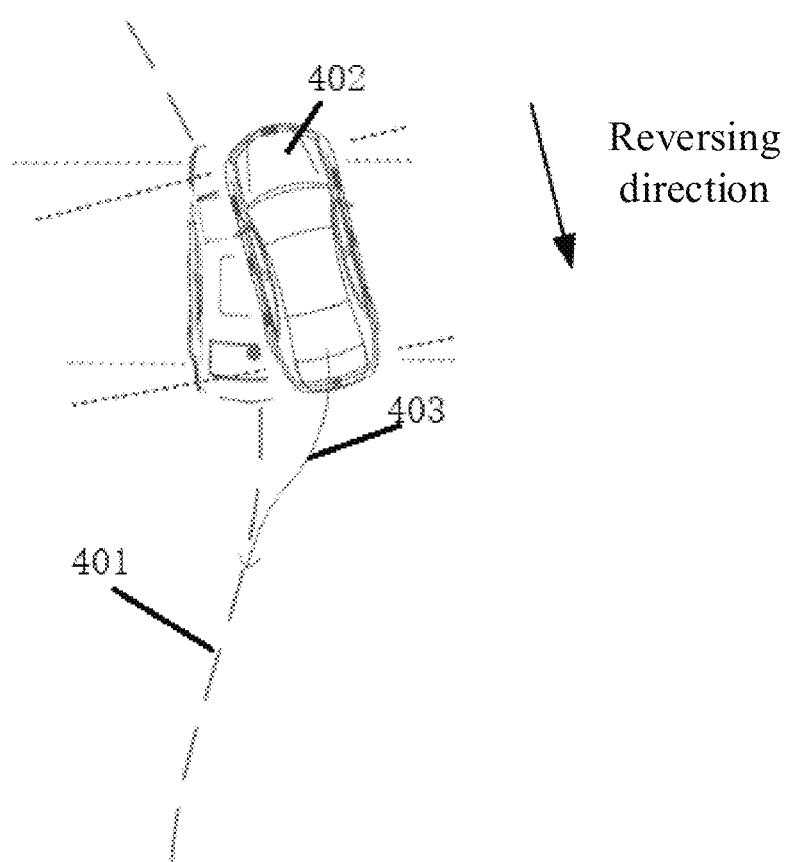
FIG. 4 is a schematic diagram of a third reversing trajectory provided in an embodiment of the present disclosure.

FIG. 4 is a schematic diagram of a third reversing trajectory in an embodiment of the present disclosure. As shown in FIG. 4, a first reversing trajectory 401, a vehicle 402, and a third reversing trajectory 403 are included. In the case where the vehicle 402 deviates from the first reversing trajectory, the third reversing trajectory 403 is determined according to the real-time position information of the vehicle 402 to correct the vehicle position.

Step 206: acquiring the first environmental obstacle information of the vehicle in a reversing driving process.

Step 207: when the first environmental obstacle information reaches a preset condition, determining a second reversing trajectory of the vehicle according to the first reversing trajectory and the first environmental obstacle information.

Step 208: controlling the vehicle to reverse according to the second reversing trajectory.

In an embodiment of the present disclosure, Step 206 to Step 208 may correspondingly refer to the relevant description of Step 103 to Step 105. In order to avoid repetition, the description will not be repeated herein.

In an embodiment of the present disclosure, after receiving a reversing instruction for a vehicle, a first reversing trajectory of the vehicle can be acquired; the vehicle can be controlled to reverse according to the first reversing trajectory, such that a driver does not need to control the vehicle, so as to avoid tedious operation by the driver. During the reversing, the first reversing trajectory can be adjusted according to the first environmental obstacle information of the vehicle or the real-time position information of the vehicle to obtain a second reversing trajectory or a third reversing trajectory, and then the vehicle is controlled to reverse according to the second reversing trajectory or the third reversing trajectory. Therefore, the danger caused by environmental obstacles during a reversing process may be avoided, and potential safety hazards in process of reversing a vehicle are eliminated.

Figure 5:
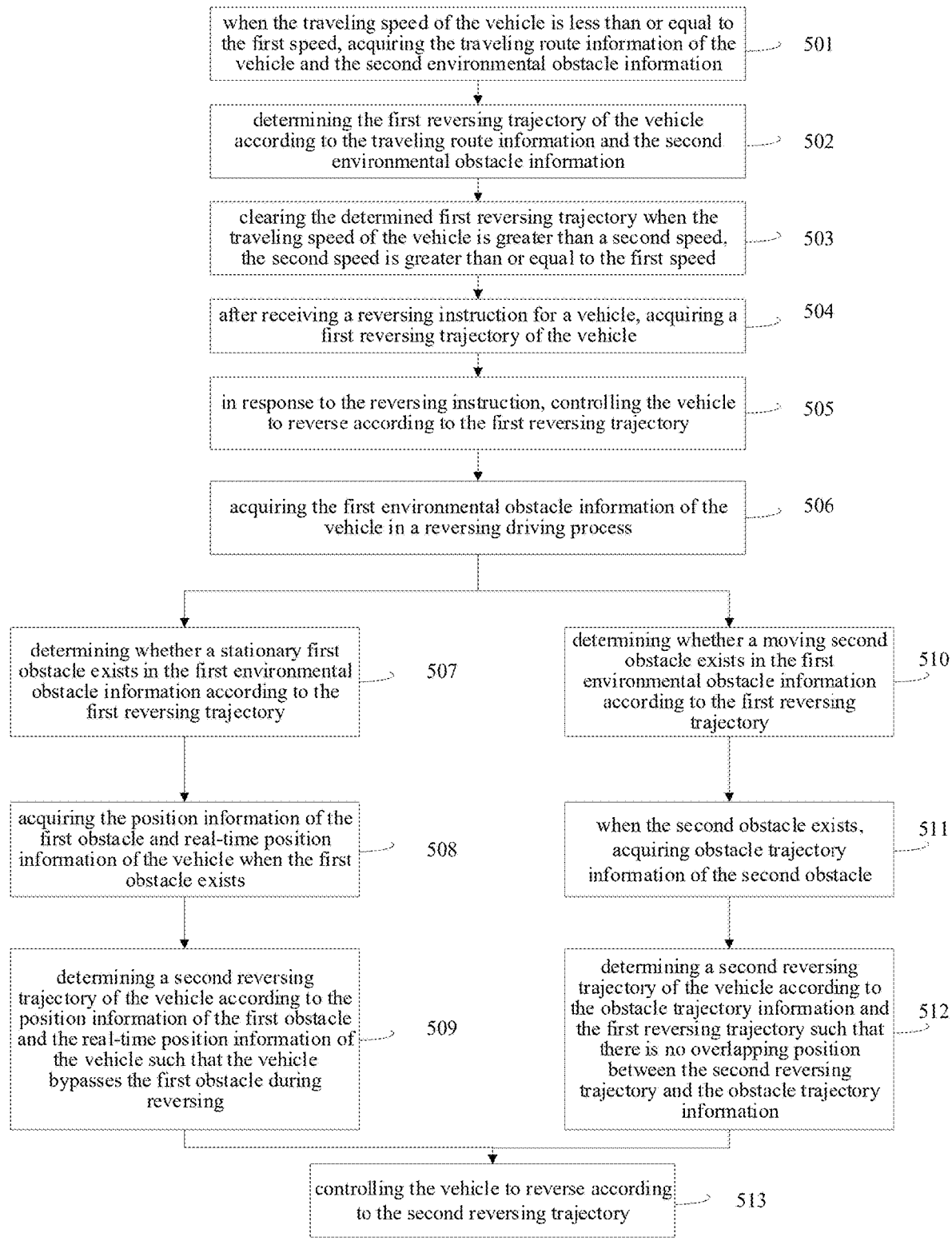
FIG. 5 is a schematic flow chart of yet another reversing control method provided in an embodiment of the present disclosure.

FIG. 5 is a schematic flow chart of another reversing control method in an embodiment of the present disclosure. As shown in FIG. 5, the method may include:

Step 501: when the traveling speed of the vehicle is less than or equal to the first speed, acquiring the traveling route information of the vehicle and the second environmental obstacle information.

In an embodiment of the present disclosure, the traveling route information and the second environmental obstacle information of the vehicle may be acquired by various types of sensors of the vehicle during the forward travelling process of the vehicle. The traveling route information may include a coordinate point acquired at preset time intervals or preset distance intervals during the forward travelling process of the vehicle, or a forward path of the vehicle obtained by satellite positioning, etc.; the second environmental obstacle information may include the information of obstacles such as other vehicles, pedestrians, road signs, etc. in the surrounding environment during the forward travelling process of the vehicle. The method for acquiring the traveling route information and the second environmental obstacle information is not limited by the embodiment of the present disclosure.

In an embodiment of the present disclosure, since it is usually required to decelerate the vehicle when reversing, it can be determined that the vehicle is likely to reverse when the traveling speed of the vehicle is less than or equal to the first speed. At this time, the traveling route information and the second environmental obstacle information of the vehicle can be acquired, so as to avoid information redundancy caused by excessive information; Optionally, the first speed can be 14 kilometers per hour, 15 kilometers per hour, 20 kilometers per hour, etc. Further, the traveling route information and/or the second environmental obstacle information of the latest preset time period or preset distance may be acquired, such as the traveling route information and/or the second environmental obstacle information within 10 minutes or 20 minutes, or the traveling route information and/or the second environmental obstacle information within 50 meters, 60 meters, 70 meters, or like circumstances.

Step 502: determining the first reversing trajectory of the vehicle according to the traveling route information and the second environmental obstacle information.

In an embodiment of the present disclosure, the first reversing trajectory of the vehicle may be determined according to the traveling route information and the second environmental obstacle information. The first reversing trajectory may include a travel route trajectory determined according to the traveling route information and the route map information determined according to the second environmental obstacle information. The travel route trajectory may include the direction, the angle, the distance, etc. of the heading of the vehicle, and the route map information may include the number, the type, the shape, the spatial distribution, etc. of the obstacles. Optionally, a Free Space algorithm can be used to identify the second environmental obstacle information, so as to generate the corresponding route map information, and the road condition to which the first reversing trajectory belongs can also be determined according to the route map information, such as an open area, a narrow lane, etc. In addition, the determined first reversing trajectory may be stored in a vehicle-mounted computer of the vehicle, or transmitted to a third-party electronic device, a server, etc. for storage.

Figure 6:
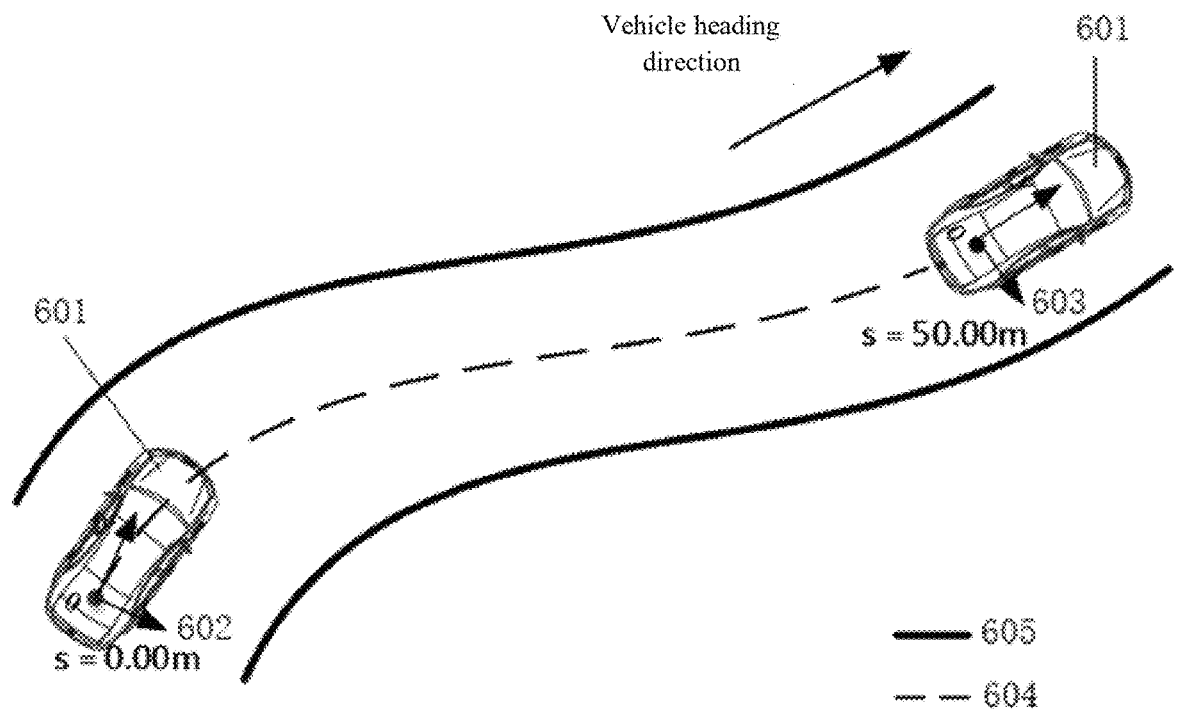
FIG. 6 is a schematic diagram of a first reversing trajectory provided in an embodiment of the present disclosure.

For example, the coordinate of the vehicle is determined by taking the rear axle direction of the vehicle as the X-axis direction, the longitudinal direction of the vehicle as the Y-axis direction, and the rear axle center as the original point, wherein the coordinate (X, Y) of the vehicle may be a relative value of the coordinate axis with respect to the world coordinate. FIG. 6 is a schematic diagram of a first reversing trajectory in an embodiment of the present disclosure. As shown in FIG. 6, when it is determined from the second environmental obstacle information that there is a continuous obstacle within 3 meters on both the left side and the right side of the vehicle 601, the obstacle may be determined as a road boundary. At this time, the traveling route information of the vehicle 601, such as the vehicle coordinate points (X, Y), etc., and the second environmental obstacle information, such as coordinate points $(X_1, Y_1)$, $(X_2, Y_2)$ ... of the obstacles on both sides of the vehicle may be acquired every one meter. According to the traveling route information, the travel route trajectory 604 of fifty meters from the coordinate point 602 to the coordinate point 603 of the vehicle is determined, and the second environmental obstacle information determines that the road condition is a narrow roadway and determines road boundaries 605 on both sides of the vehicle.

Figure 7:
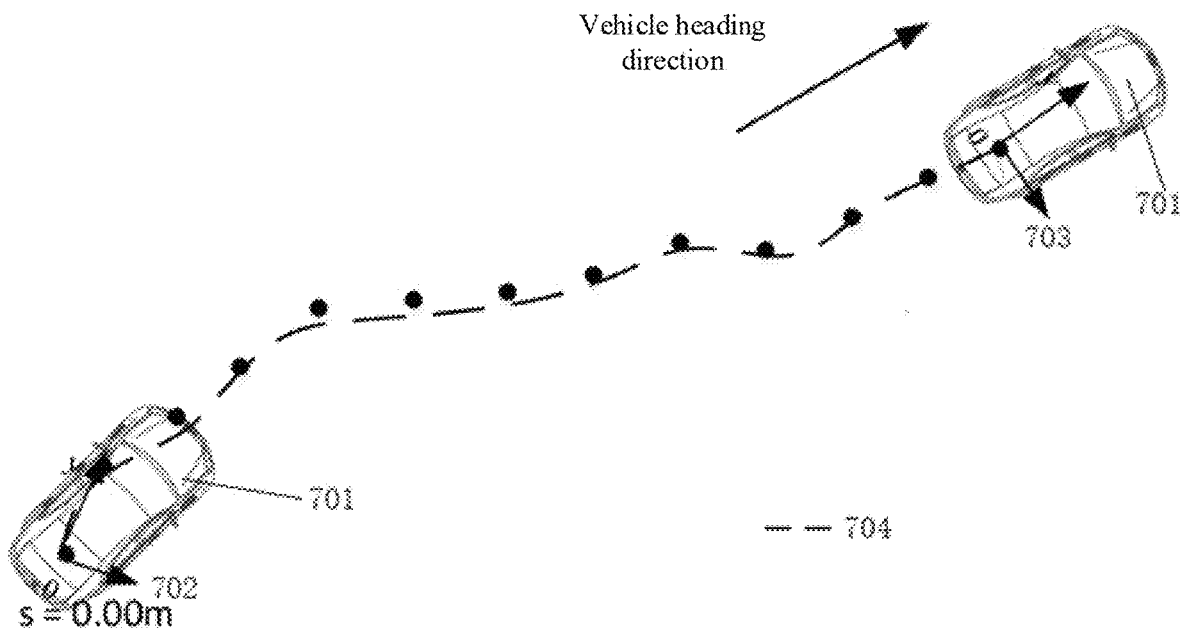
FIG. 7 is a schematic diagram of another first reversing trajectory provided in an embodiment of the present disclosure.

FIG. 7 is a schematic diagram of another first reversing trajectory in an embodiment of the present disclosure. As shown in FIG. 7, when it is determined from the second environmental obstacle information that there is no continuous obstacle within 3 meters on both the left side and the right side of the vehicle 701, the traveling route information of the vehicle 701, such as the vehicle coordinate point (X, Y), etc. maybe acquired every 1 meter. The travel route trajectory 704 of the vehicle from the coordinate point 702 to the coordinate point 703, 50 meters, is determined according to the traveling route information. According to the second environmental obstacle information, it is determined that the road condition is an open area.

In an embodiment of the present disclosure, the distance of the travel route trajectory may be calculated via the wheel speed pulse, i.e., the distance of the travel route trajectory is calculated by calculating the travel distance of the vehicle in one pulse of the wheel and counting the number of wheel pulses.

Figure 8:
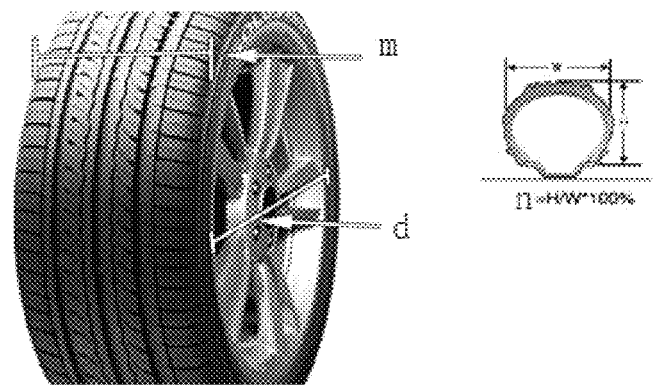
FIG. 8 is a schematic diagram of a calculation method of a wheel circumference provided in an embodiment of the present disclosure.

FIG. 8 is a schematic diagram of a calculation method for a wheel circumference in an embodiment of the present disclosure. As shown in FIG. 8, the wheel rotates one round, and the vehicle travel distance is the circumference of the wheel, which is calculated by the following formula (1):

$$S=\pi D \tag{1}$$

wherein D is the total wheel diameter, which can be calculated by the following formula (2):

$$D=2.54d+2mn \tag{2}$$

where d is the diameter of the hub, typically in inches; m is the tire width of the wheel; n is the aspect ratio of the wheel, obtained by calculating the percentage of the cross-sectional height H of the tire to the maximum cross-sectional width W.

When the number of wheel pulses for one wheel revolution is N, the vehicle travel distance S1 in one wheel pulse can be calculated by the following formula (3):

$$S1=S/N \tag{3}$$

wherein N can be 96.

Figure 9:
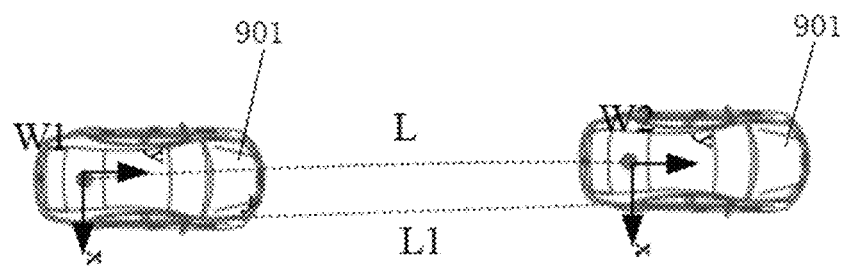
FIG. 9 is a schematic diagram of calculating a straight traveling distance of a vehicle provided in an embodiment of the present disclosure.

FIG. 9 is a schematic diagram for calculating the straight traveling distance of a vehicle in an embodiment of the present disclosure. As shown in FIG. 9, when a vehicle 901 moves straight from a W1 position to a W2 position, it is possible to calculate the rear axle center moving distance L, which serves as the distance L1 of the vehicle travel route trajectory, via the number of wheel pulses and the vehicle travel distance S1 in one wheel pulse.

Figure 10:
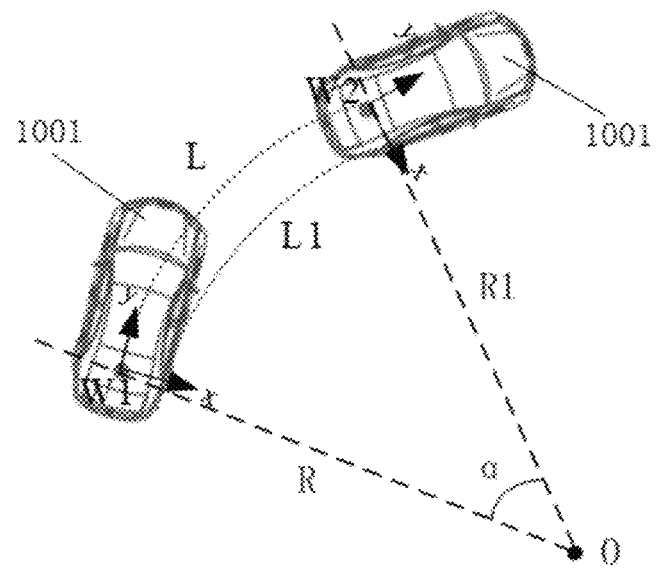
FIG. 10 is a schematic diagram of calculating a turning distance of a vehicle provided in an embodiment of the present disclosure.

FIG. 10 is a schematic diagram of calculating a turning distance of a vehicle in an embodiment of the present disclosure. As shown in FIG. 10, when a vehicle 1001 is turning from the W1 position to the W2 position, the rear axle center moving distance L, which serves as the distance L1 of the vehicle travel route trajectory, can be calculated via the number of wheel pulses, the travel distance S1 of the vehicle in one wheel pulse, and the steering wheel angle. The calculation formula (4) is as follows:

$$L = R \cdot \alpha \quad (4)$$

where L is the moving distance of the rear axle center of the vehicle; R is the turning radius corresponding to the rear axle center under the current steering wheel angle; a is the traveling angle of the vehicle from position W1 to position W2; L1 is the distance traveled by the rear wheel axis of the inner circle of the vehicle; R1 is the turning radius corresponding to the inner circle rear wheel axis under the current steering wheel angle; point O is the center of the circle corresponding to the traveling arc length of the vehicle.

At this time, a can be calculated by the following formula (5):

$$\alpha = L1/R1 \quad (5)$$

Step 503: clearing the determined first reversing trajectory when the traveling speed of the vehicle is greater than a second speed, the second speed is greater than or equal to the first speed.

In an embodiment of the disclosure, since the driving intention of the driver is generally forward when the vehicle travels at a high speed, it is possible to determine the second speed that is greater than or equal to the first speed, and clear the determined first reversing trajectory in the case where the vehicle travels at a speed greater than the second speed, so as to avoid the accumulation of a large amount of information which affects the calculation efficiency.

Step 504: after receiving a reversing instruction for a vehicle, acquiring a first reversing trajectory of the vehicle.

Step 505: in response to the reversing instruction, controlling the vehicle to reverse according to the first reversing trajectory.

In an embodiment of the present disclosure, Step 504 to Step 505 may correspond to the relevant descriptions with reference to Step 101 to Step 102. In order to avoid repetition, the description will not be repeated herein.

In an embodiment of the present disclosure, when it is determined that the road condition is a narrow roadway according to the route map information, after receiving the reversing instruction, the vehicle may first acquire the environmental obstacle information on the left side and the right side of the vehicle and acquire the travel route trajectory. At this time, the first reversing trajectory of the vehicle reversing is fitted in real time according to the travel route trajectory, the environmental obstacle information on the left side and the right side of the vehicle, and the position coordinate information of the central point of the vehicle acquired in real time. Optionally, the first reversing trajectory may be fitted by various means such as a straight-line equation, an equation of a circle, a polynomial curve equation, etc., and the safety, driving comfort experience, and the like may be further considered. For example, the travel route trajectory with a large number of turns is smoothed, the travel route trajectory with a large number of bypassing obstacles is re-planned, etc.

Figure 11:
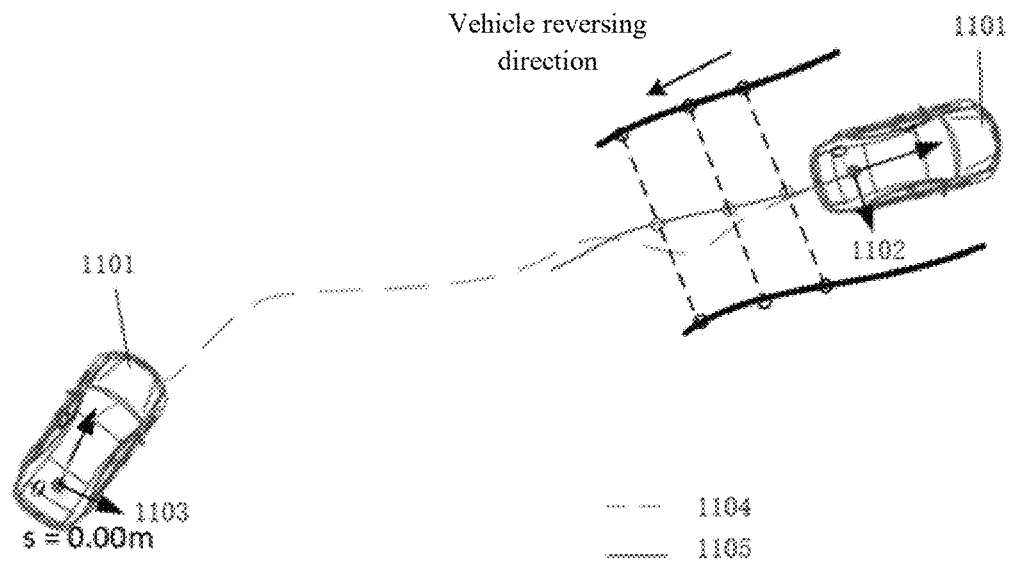
FIG. 11 is a schematic diagram of yet another first reversing trajectory provided in an embodiment of the present disclosure.

FIG. 11 is a schematic diagram of yet another first reversing trajectory in an embodiment of the present disclosure. As shown in FIG. 11, a vehicle 1101 reverses from a coordinate point 1102 to a coordinate point 1103, and the coordinate point 1102 to the coordinate point 1103 includes a travel route trajectory 1104 therebetween. It can be seen that the travel route trajectory 1104 turns a lot and is not suitable to be directly used as the first reversing trajectory. At this time, a relatively smooth first reversing trajectory 1105 can be obtained by re-planning according to the direction of the travel route trajectory 1104, so as to avoid multiple turns in the process of reversing and improving the efficiency of reversing.

In an embodiment of the present disclosure, when reversing a vehicle via the first reversing trajectory, the real-time position information of the vehicle can be acquired. When the real-time position information of the vehicle deviates from the first reversing trajectory, correction is performed according to the real-time position information of the vehicle to obtain the third reversing trajectory. The correction process may correspondingly refer to the relevant description of Step 204, which is not repeated herein to avoid repetition.

Figure 12:
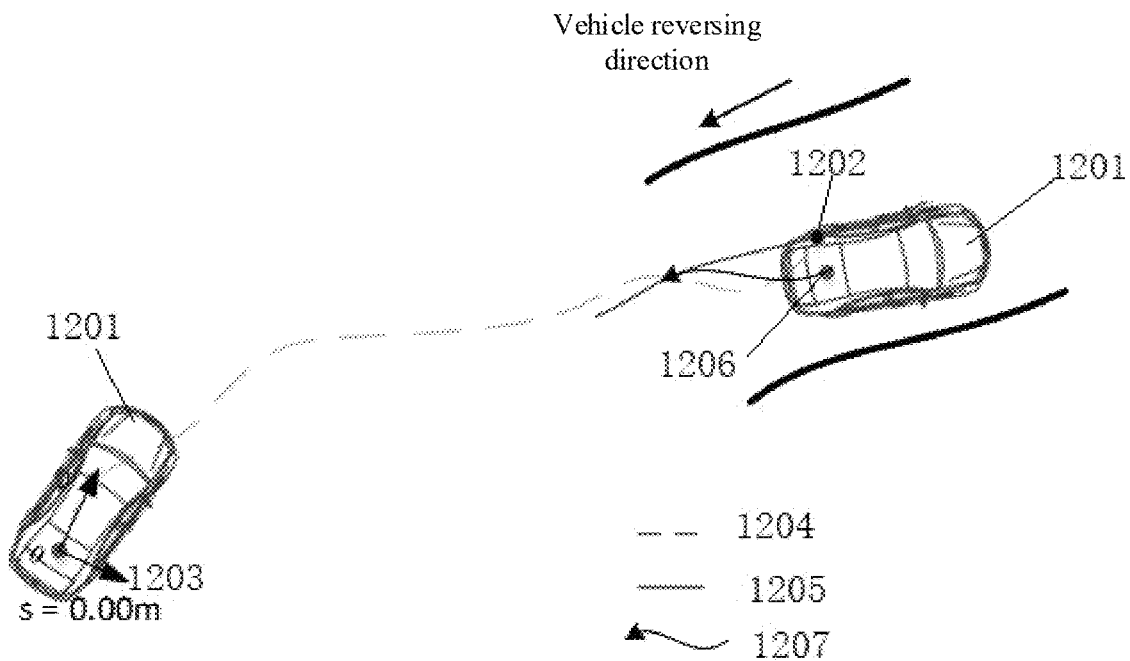
FIG. 12 is a schematic diagram of a first reversing trajectory deviation correction provided in an embodiment of the present disclosure.

FIG. 12 is a schematic diagram of a first reversing trajectory deviation correction in an embodiment of the present disclosure. As shown in FIG. 12, a vehicle 1201 reverses from a coordinate point 1202 to a coordinate point 1203. A travel route trajectory 1204 and a first reversing trajectory 1205 are included between coordinate point 1202 and coordinate point 1203. However, when the current coordinate point 1206 of the vehicle 1201 deviates from the coordinate point 1202, deviation correction can be performed on the first reversing trajectory 1205 to obtain the third reversing trajectory 1207.

Step 506: acquiring the first environmental obstacle information of the vehicle in a reversing driving process.

In an embodiment of the present disclosure, Step 506 may correspondingly refer to the relevant descriptions of Step 103. In order to avoid repetition, the description will not be repeated herein.

Step 507: determining whether a stationary first obstacle exists in the first environmental obstacle information according to the first reversing trajectory.

In an embodiment of the present disclosure, the first environmental obstacle information may be compared with the map path information in the first reversing trajectory so that the size, shape, position, etc. of the obstacle may be determined from the first environmental obstacle information. Compare its degree of change with the map path information to determine whether there is an obstacle whose degree of change reaches the preset degree of change. Optionally, the obstacles may be classified as a stationary or moving obstacle, in which case the stationary obstacle may be taken as a first obstacle, such as a road sign, other parking vehicles, a building, etc.

Step 508: acquiring the position information of the first obstacle and real-time position information of the vehicle when the first obstacle exists.

In an embodiment of the present disclosure, in the case where it is determined that a stationary first obstacle exists, the position information of the first obstacle and the real-time position information of the vehicle can be acquired. The position information of the first obstacle can be determined from the first environmental obstacle information, and the acquisition method of the real-time position information of the vehicle can correspondingly refer to the relevant description of Step 203, which will not be repeated herein to avoid repetition.

Step 509: determining a second reversing trajectory of the vehicle according to the position information of the first obstacle and the real-time position information of the vehicle such that the vehicle bypasses the first obstacle during reversing.

In an embodiment of the present disclosure, the second reversing trajectory of the vehicle can be determined according to the position information of the first obstacle and the real-time position information of the vehicle. Optionally, the distance between the position information of the first obstacle and the real-time position information of the vehicle can be determined firstly, and based on that, when the distance is less than or equal to a preset correction distance, whether a trajectory other than the first reversing trajectory, such as a travel route trajectory, can bypass the first obstacle can be determined; and if so, according to the real-time position information and the first reversing trajectory, a plurality of coordinate points near the real-time position information in the first reversing trajectory can be determined through traversal, and obtaining the correction to the other trajectory according to the consecutive coordinate points of a plurality of coordinate points so as to obtain the second reversing trajectory is performed; when the distance is greater than the preset correction distance, a new second reversing trajectory may also be re-planned according to the position information of the first obstacle and the real-time position information of the vehicle, which is not particularly limited by the embodiments of the present disclosure.

Figure 13:
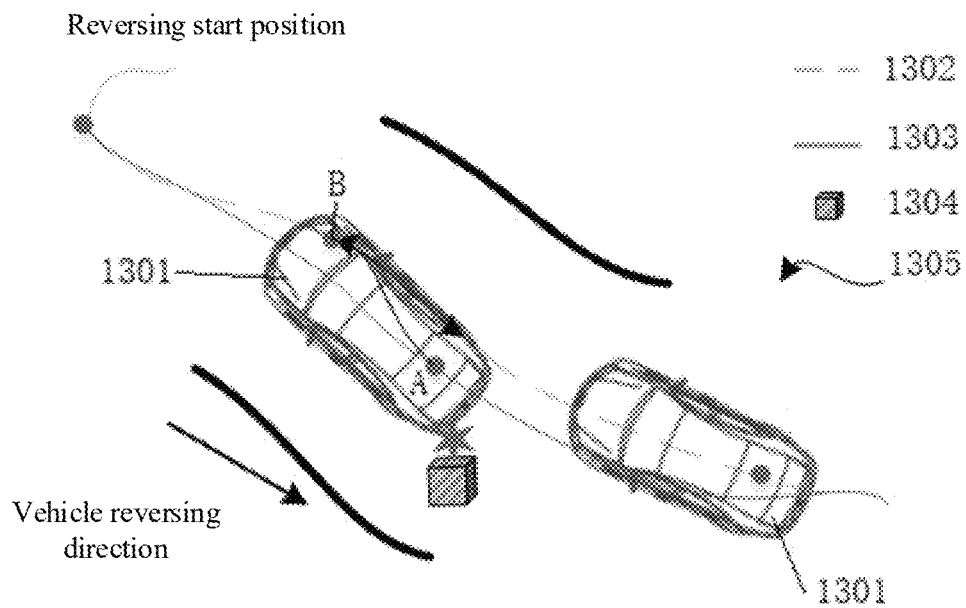
FIG. 13 is a schematic diagram of a second reversing trajectory provided in an embodiment of the present disclosure.

FIG. 13 is a schematic diagram of a second reversing trajectory in an embodiment of the present disclosure. As shown in FIG. 13, the second reversing trajectory includes a vehicle 1301, a travel route trajectory 1302, a first reversing trajectory 1303, a first obstacle 1304, and a second reversing trajectory 1305. The first obstacle 1304 is detected when the vehicle 1301 reaches the point A while reversing along the first reversing trajectory 1303; since the distance from the point A to the first obstacle 1504 is less than the preset correction distance, the travel route trajectory 1302 can be considered at this moment; since the first obstacle 1304 is not encountered along the travel route trajectory 1302, the second reversing trajectory 1305 can be determined according to the position information of the first obstacle 1304 and the real-time position information of the vehicle 1301; therefore, it is possible for the vehicle 1301 to go from the point A of the first reversing trajectory 1303 to the point B of the travel route trajectory 1302 according to the second reversing trajectory 1305, and reverse along the travel route trajectory 1302, so as to bypass the first obstacle 1304; besides, after bypassing the first obstacle 1304, it is possible to reverse from the travel route trajectory 1302 to the first reversing trajectory 1303 to obtain the second reversing trajectory. Thereafter, the vehicle may continue to reverse along the second reversing trajectory, or the reversing trajectory may be re-planned according to the first environmental obstacle information and the second reversing trajectory. At this time, the second reversing trajectory 1305 includes a partial travel route trajectory 1302, a partial first reversing trajectory 1303, and a reversing trajectory AB.

Figure 14:
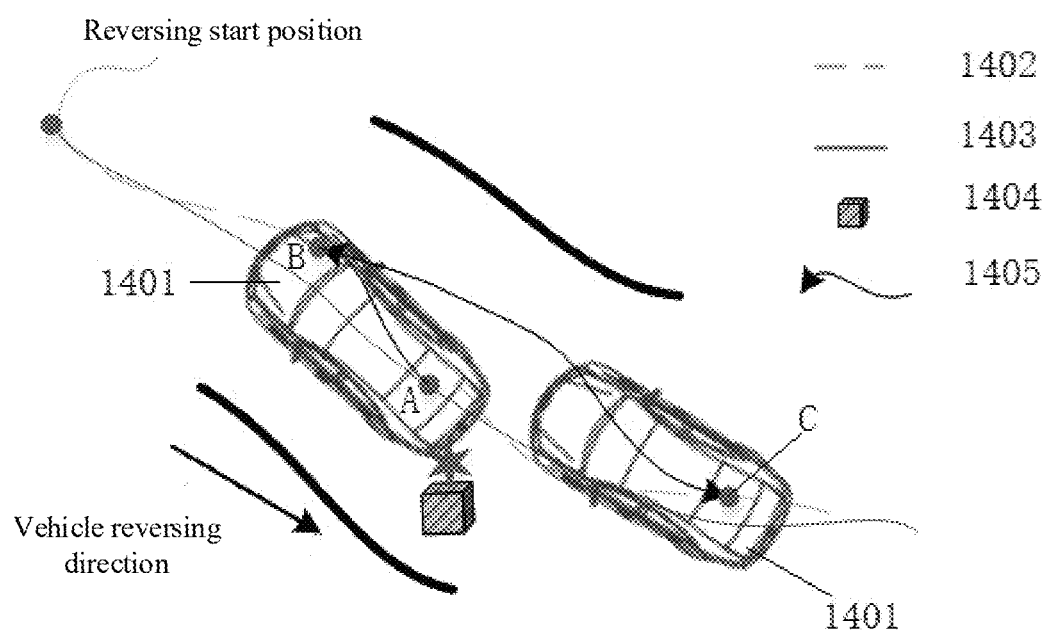
FIG. 14 is a schematic diagram of another second reversing trajectory provided in an embodiment of the present disclosure.

FIG. 14 is a schematic diagram of another second reversing trajectory in an embodiment of the present disclosure. As shown in FIG. 14, the second reversing trajectory includes a vehicle 1401, a travel route trajectory 1402, a first reversing trajectory 1403, a first obstacle 1404, and a second reversing trajectory 1405. The first obstacle 1404 is detected when the vehicle 1401 reaches point A while reversing along the first reversing trajectory 1403; since the distance from point A to the first obstacle 1504 is less than the preset correction distance, the travel route trajectory 1402 can be considered at this moment; since the first obstacle 1404 will be encountered along the travel route trajectory 1402, after the vehicle 1401 goes from the point A of the first reversing trajectory 1403 to the point B of the travel route trajectory 1402, the reversing trajectory BC bypassing the first obstacle 1404 can be re-planned, so as to bypass the first obstacle 1404; besides, after bypassing the first obstacle 1404, it is possible to reverse from the reversing trajectory BC to the first reversing trajectory 1403 to obtain the second reversing trajectory. Thereafter, the vehicle may continue to reverse along the second reversing trajectory, or the reversing trajectory may be re-planned according to the first environmental obstacle information and the second reversing trajectory. At this time, the second reversing trajectory 1405 includes a part of the first reversing trajectory 1403 and a reversing trajectory ABC.

Figure 15:
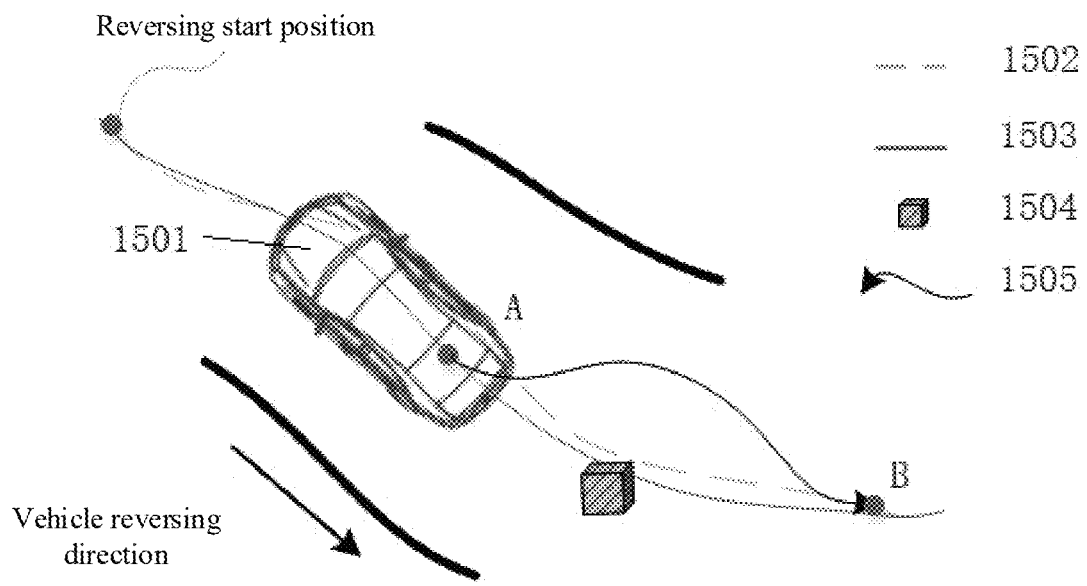
FIG. 15 is a schematic diagram of yet another second reversing trajectory provided in an embodiment of the present disclosure.

FIG. 15 is a schematic diagram of another second reversing trajectory in an embodiment of the present disclosure. As shown in FIG. 15, the second reversing trajectory includes a vehicle 1501, a travel route trajectory 1502, a first reversing trajectory 1503, a first obstacle 1504, and a second reversing trajectory 1505. The first obstacle 1504 is detected when the vehicle 1501 reaches point A when reversing along the first reversing trajectory 1503. Since the distance from point A to the first obstacle 1504 is greater than the preset correction distance, the reversing trajectory AB bypassing the first obstacle 1504 can be re-planned at this time. In addition, the reversing trajectory AB may return to the first reversing trajectory 1503. Thereafter, the vehicle may continue to reverse along the second reversing trajectory, or the reversing trajectory may be re-planned according to the first environmental obstacle information and the second reversing trajectory. At this time, the second reversing trajectory 1505 includes a part of the first reversing trajectory 1503 and the reversing trajectory AB.

When the vehicle in FIG. 13 and FIG. 14 switches to the second reversing trajectory, it is possible to first control the vehicle gear to switch to the forward gear, adjust and correct the vehicle body angle, enter the second reversing trajectory, then control the vehicle gear to switch to the reverse gear to reverse along the second reversing trajectory, and perform obstacle avoidance processing. In FIG. 15, it is sufficient to continue to maintain the reverse gear, adjust and correct the vehicle body angle to enter the second reversing trajectory to reverse, and perform obstacle avoidance processing.

Optionally, before Step 509, the following steps are further included:

Sub-Step S11: determining whether a second reversing trajectory exists according to the position information of the first obstacle and the real-time position information of the vehicle or not.

Sub-Step S12: controlling the vehicle to stop reversing when the second reversing trajectory does not exist.

In an embodiment of the disclosure, it may be impossible to obtain a second reversing trajectory capable of bypassing the first obstacle according to the position information of the first obstacle and the real-time position information of the vehicle due to limited computing power, insufficient information collection, or other reasons. At this time, the vehicle may be controlled to stop reversing, such as controlling the vehicle to stop, or reminding the driver to perform vehicle control, etc. Further, the position of the first obstacle may be prompted so that the driver knows the current road conditions.

Step 510: determining whether a moving second obstacle exists in the first environmental obstacle information according to the first reversing trajectory.

In an embodiment of the disclosure, the moving obstacle may be determined as the second obstacle, such as a pedestrian, other vehicles traveling, etc. The method for determining whether the second obstacle exists may correspondingly refer to the relevant description of Step 507, which is not particularly limited by the embodiments of the present disclosure in order to avoid repetition.

Step 511: when the second obstacle exists, acquiring obstacle trajectory information of the second obstacle.

In an embodiment of the present disclosure, the obstacle trajectory information of a second obstacle may be acquired. The obstacle trajectory information may include the information of the moving trajectory of the second obstacle, and may further include the trajectory information of a prediction of the second obstacle. Taking the second obstacle as a pedestrian as an example, a pedestrian around the vehicle may be identified through a mechanical learning algorithm for salient human instance segmentation in a video image, so as to obtain the obstacle trajectory information of the pedestrian.

Step 512: determining a second reversing trajectory of the vehicle according to the obstacle trajectory information and the first reversing trajectory such that there is no overlapping position between the second reversing trajectory and the obstacle trajectory information.

In an embodiment of the present disclosure, there is no overlapping position between the second reversing trajectory and the obstacle trajectory information. When the vehicle reverses according to the second reversing trajectory, the vehicle can be controlled to stop before reaching the overlapping position between the obstacle trajectory information and the first reversing trajectory, and the vehicle can be controlled to reverse after the second obstacle passes the overlapping position; it may also be the case that when the vehicle reverses according to the second reversing trajectory, the overlapping position of the obstacle trajectory information and the first reversing trajectory may be bypassed, which will not be particularly limited by the embodiments of the present disclosure.

Step 513: controlling the vehicle to reverse according to the second reversing trajectory.

In an embodiment of the present disclosure, Step 513 may correspondingly refer to the relevant description of Step 102, which will not be repeated here to avoid repetition.

Optionally, after Step 505, the following steps are further included:

Sub-Step S21: prompting a real-time remaining distance of the first reversing trajectory during a reversing.

In an embodiment of the present disclosure, it is also possible to, during the reversing, calculate the real-time distance of the reversed driving and calculate the real-time remaining distance according to the actual distance of the first reversing trajectory. The calculation method of the real-time distance may correspondingly refer to the relevant description of Step 502, which will not be repeated here to avoid repetition. In addition, in an embodiment of the present disclosure, the real-time remaining distance may be prompted by a corresponding distance value displayed on a head unit of a vehicle-mounted computer, or the real-time remaining distance may be prompted by a voice output, etc. The embodiment of the present disclosure does not limit the manner of prompting the real-time remaining distance.

Figure 16:
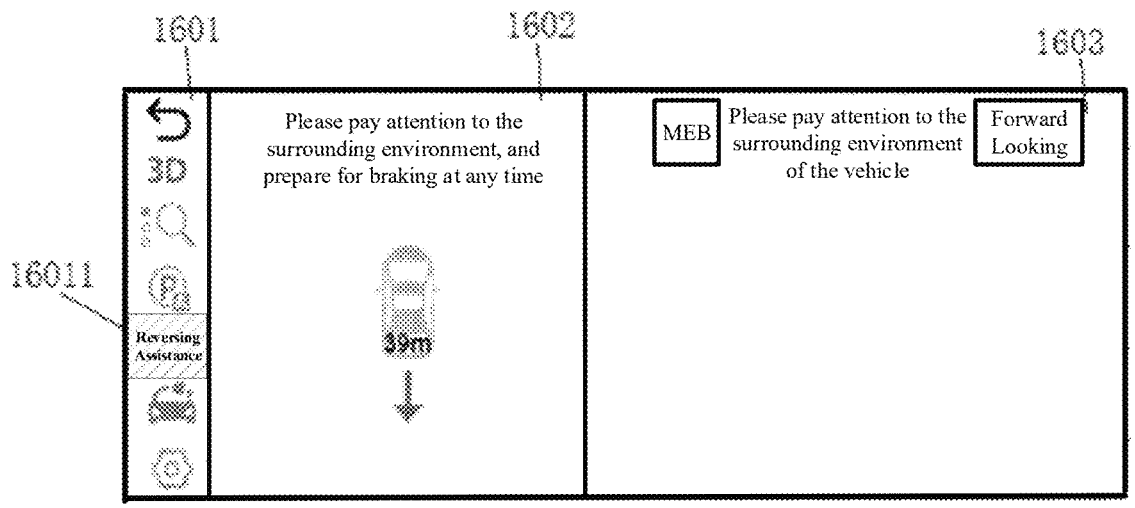
FIG. 16 is a schematic diagram of a real-time remaining distance prompt interface provided in an embodiment of the present disclosure.

FIG. 16 is a schematic diagram of a prompt interface of a real-time remaining distance provided by an embodiment of the present disclosure. As shown in FIG. 16, the display interface includes a key area 1601, a prompt area 1602, and an image area 1603. The key area 1601 can display a key for triggering the corresponding function, such as a "reversing assistance" key 16011; the prompt area 1602 is used for prompting that the reversing is in progress, and displaying the real-time remaining distance "39 m", and optionally, it also prompting that "please pay attention to the surrounding environment, and prepare for braking at any time", so as to prompt the driver that the reversing is about to end, so as to avoid poor driving experience caused by sudden braking; the image area 1603 may display the images captured by the front and rear cameras of the vehicle, so as to facilitate the current surroundings of the driver and the vehicle, further avoiding and eliminating safety hazards.

Figure 17:
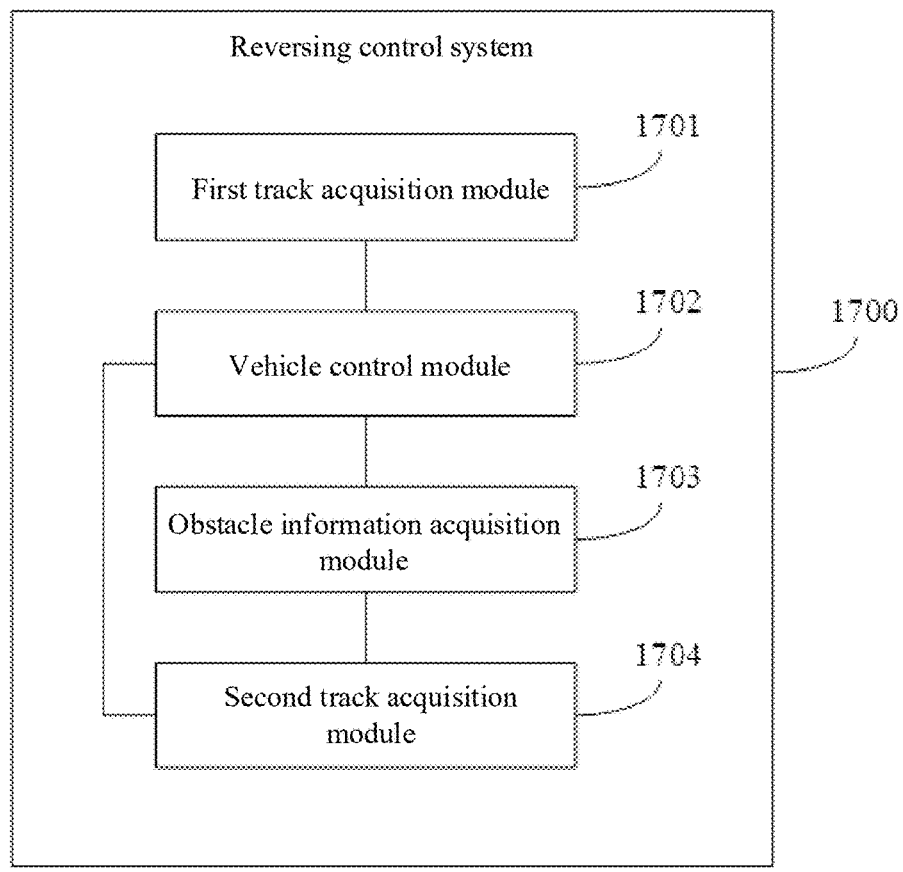
FIG. 17 is a schematic diagram of the structure of a reversing control system provided in an embodiment of the present disclosure.

Another object of the present disclosure is to provide a reversing control system. The reference is made to FIG. 17, which shows a schematic diagram of the structure of a reversing control system according to an embodiment of the present disclosure. The system includes:

a first reversing trajectory acquisition module 1701 configured for, acquiring a first reversing trajectory of a vehicle after receiving a reversing instruction for the vehicle;

a vehicle control module 1702 configured for, controlling the vehicle to reverse according to the first reversing trajectory in response to the reversing instruction;

an obstacle information acquisition module 1703 configured for, acquiring the first environmental obstacle information of the vehicle during reversing; and a second reversing trajectory acquisition module 1704 configured for, determining a second reversing trajectory of the vehicle according to the first reversing trajectory and the first environmental obstacle information when the first environmental obstacle information reaches a preset condition;

wherein the vehicle control module 1702 is further configured for, controlling the vehicle to reverse according to the second reversing trajectory.

Optionally, in the system, further includes:

a real-time information acquisition module configured for, acquiring the real-time position information of the vehicle; and a third reversing trajectory acquisition module configured for, determining a third reversing trajectory according to the first reversing trajectory and the real-time position information when the real-time position information deviates from the first reversing trajectory;

wherein the vehicle control module 1702 is further configured for, controlling the vehicle to reverse according to the third reversing trajectory.

Optionally, in the system, the second reversing trajectory acquisition module 1704 includes:

a first obstacle sub-module configured for, determining whether a stationary first obstacle exists in the first environmental obstacle information according to the first reversing trajectory;

a first information sub-module configured for, acquiring the position information of the first obstacle and the real-time position information of the vehicle when the first obstacle exists; and a first reversing trajectory sub-module configured for, determining a second reversing trajectory of the vehicle according to the position information of the first obstacle and the real-time position information of the vehicle, such that the vehicle bypasses the first obstacle during reversing.

Optionally, in the system, the second reversing trajectory acquisition module 1704 includes:

a second obstacle sub-module configured for, determining whether a moving second obstacle exists in the first environmental obstacle information according to the first reversing trajectory;

a second information sub-module configured for, acquiring obstacle trajectory information of the second obstacle when the second obstacle exists; and a second reversing trajectory sub-module configured for, determining the second reversing trajectory of the vehicle according to the obstacle trajectory information and the first reversing trajectory such that there is no overlapping position between the second reversing trajectory and the obstacle trajectory information.

Optionally, in the system, the obstacle information acquisition module 1703 is further configured for, acquiring the traveling route information of the vehicle and the second environmental obstacle information in the case that the traveling speed of the vehicle is less than or equal to the first speed;

the first reversing trajectory acquisition module 1701 is further configured for, determining the first reversing trajectory of the vehicle according to the traveling route information and the second environmental obstacle information.

Optionally, the first reversing trajectory acquisition module 1701 is further configured for, clearing the determined first reversing trajectory if the traveling speed of the vehicle is greater than the second speed, the second speed being greater than or equal to the first speed.

Optionally, in the system, the second reversing trajectory acquisition module 1704 further includes:

the first reversing trajectory sub-module is further configured for, determining whether a second reversing trajectory exists according to the position information of the first obstacle and the real-time position information of the vehicle;

and the vehicle control module is further configured to control the vehicle to end reversing when the second reversing trajectory does not exist.

Optionally, in the system, the following is further included:

an information prompt module configured for, prompting a real-time remaining distance of the first reversing trajectory during a reversing.

An embodiment of the present disclosure also proposes a vehicle including a system implementing the reversing control method as described above; or the vehicle includes the reversing control system as described above.

The reversing control system and the vehicle have the same advantages as the above-described reversing control method with respect to the prior art, which will not be described in detail herein.

Figure 18:
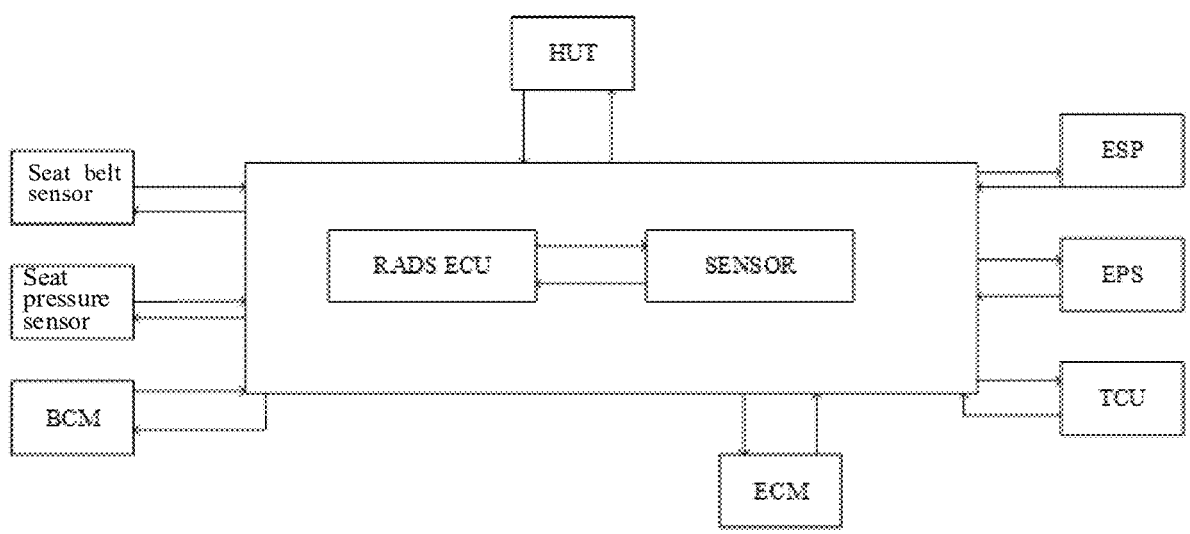
FIG. 18 is an exemplary diagram of a vehicle system architecture provided in an embodiment of the present disclosure.

FIG. 18 is an exemplary diagram of a vehicle system architecture provided in an embodiment of the present disclosure. As shown in FIG. 18, in practical applications, an embodiment of the present disclosure may be applied to a vehicle equipped with a Road Alignment Design (RADS) Electronic Control Unit (ECU). The RADS ECU may perform functions of recording and clearing a forward trajectory of the vehicle, playing back the forward trajectory, correcting the position of the vehicle, and re-planning the forward trajectory, etc. For example, in a specific implementation process, the RADS ECU can drive various types of sensors to collect the environmental obstacle information of the vehicle, and screen, calculate, process, etc., the collected environmental obstacle information, so as to determine the environmental state around the vehicle; the gear information fed back by the TCU may be confirmed, and an instruction to switch to a target gear may be output to the TCU; the steering wheel angle information fed back by the EPS may also be confirmed, and an instruction to switch to a target steering wheel angle may be output to the EPS; it is also possible to determine whether to drive the ESP to perform braking control by confirming the vehicle travel distance through the wheel speed pulse information fed back by the ESP; the engine power output information fed back by the ECM may be confirmed, and an instruction to switch to the target power output of the engine may be output to the ECM; the vehicle battery mode fed back by the Passive Entry Passive Start (PEPS) may also be confirmed, and an instruction to switch to the target vehicle battery mode may be output to the PEPS. The target gear, the target steering wheel angle, the target power output, the target vehicle battery mode, etc. may be determined by the RADS ECU according to the path, direction, etc. of the first reversing trajectory or the second reversing trajectory, which will not be particularly limited by the embodiment of the present disclosure.

In addition, the RADS ECU may further receive a reversing instruction through a HUT (Head Unit); it is also possible to confirm that the door of the vehicle is in an open/closed state by the door state information output by the BCM, and to output a door open/close instruction or the like to the BCM; it is also possible to collect the information of the driver or other persons in the vehicle through a seat belt sensor or a seat pressure sensor so as to determine the driving intention of the driver or other persons in the vehicle; the acquired traveling route information, the first environmental obstacle information, etc. and the acquired first reversing trajectory, second reversing trajectory, third reversing trajectory, etc. may be stored in an eMMC (Embedded Multi-media Card) storage module.

Figure 19:
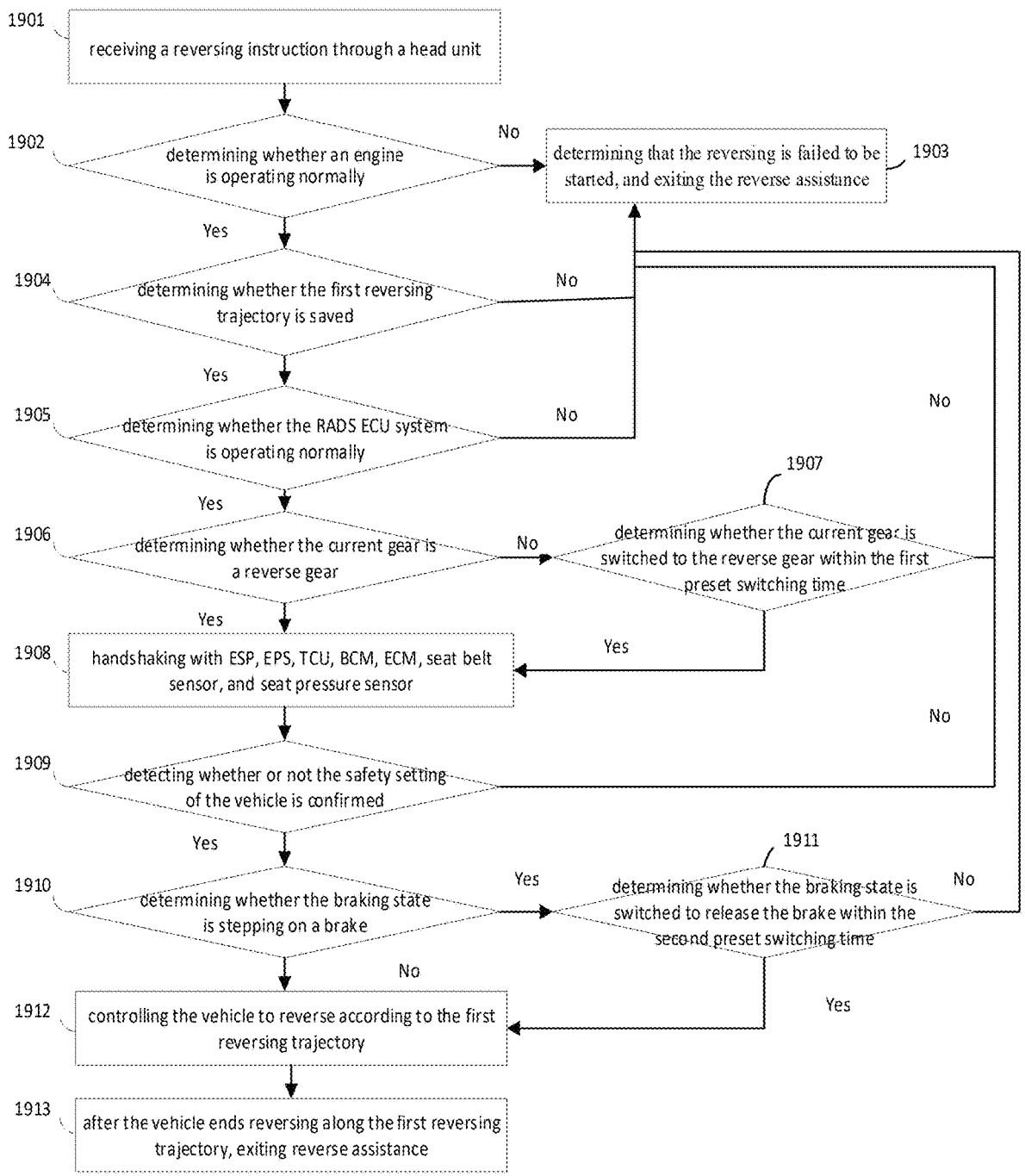
FIG. 19 is a schematic diagram of an application of a reversing control flow provided in an embodiment of the present disclosure.

FIG. 19 is a schematic diagram of an application of a reversing control flow provided by an embodiment of the present disclosure. As shown in FIG. 19, in the vehicle system architecture shown in FIG. 18, the implementation flow of the reverse control for executing reverse assistance through the RADS ECU system is:

Step 1901: receiving a reversing instruction through a head unit;

Step 1902: determining whether an engine is operating normally, if not, executing Step 1903; if so, executing Step 1904;

Step 1903: determining that the reversing is failed to be started, and exiting the reverse assistance;

Step 1904: determining whether the first reversing trajectory is saved; if not, executing Step 1903; if so, executing Step 1905;

Step 1905: determining whether the RADS ECU system is operating normally, if not, executing Step 1903; if so, executing Step 1906;

Step 1906: determining whether the current gear is a reverse gear, if not, executing Step 1907; if so, executing Step 1908;

Step 1907: determining whether the current gear is switched to the reverse gear within the first preset switching time, if not, executing Step 1903; if so, executing Step 1908;

Step 1908: handshaking with ESP, EPS, TCU, BCM, ECM, seat belt sensor, and seat pressure sensor;

Step 1909: detecting whether or not the safety setting of the vehicle is confirmed, if not, executing Step 1903; and if so, executing Step 1910;

Step 1910: determining whether the braking state is stepping on a brake; if so, executing Step 1911; if not, executing Step 1912;

Step 1911: determining whether the braking state is switched to release the brake within the second preset switching time, if not, executing Step 1903; and if so, executing Step 1912;

Step 1912: controlling the vehicle to reverse according to the first reversing trajectory; and Step 1913: after the vehicle ends reversing along the first reversing trajectory, exiting reverse assistance.

In summary, in an embodiment of the present disclosure, after receiving a reversing instruction for a vehicle, a first reversing trajectory of the vehicle can be acquired; the vehicle can be controlled to reverse according to the first reversing trajectory, such that a driver does not need to control the vehicle, thus avoiding tedious operation by the driver; during a reversing process the first reversing trajectory can be adjusted according to first environmental obstacle information of the vehicle, to acquire a second reversing trajectory; and the vehicle is then controlled to reverse according to the second reversing trajectory. Thus, the danger caused by environmental obstacles during a reversing process may be avoided, and potential safety hazards in process of reversing a vehicle are eliminated.

The embodiments of the apparatus described above are merely schematic, wherein the units illustrated as separate parts may or may not be physically separated, and the parts shown as units may or may not be physical units, i.e., they may be located in one place, or may also be distributed over a plurality of network units. Some or all of the modules may be selected to achieve the objects of the embodiment schemes according to actual needs. A person of ordinary skills in the art could understand and implement the present disclosure without involving any inventive efforts.

Various part embodiments of the present disclosure may be implemented in hardware, or in a software module running on one or more processors, or in a combination thereof. Those skilled in the art will appreciate that a microprocessor or digital signal processor (DSP) may be used in practice to implement some or all of the functions of some or all of the parts of a computing processing device according to the embodiments of the present disclosure. The present disclosure may also be embodied as a device or an apparatus program (e.g., a computer program and a computer program product) for performing a portion or all of the methods described herein. Such a program implementing the present disclosure may be stored on a computer-readable medium or may be in the form of one or more signals. Such signals may be downloaded from an Internet website, provided on a carrier signal, or provided in any other form.

Figure 20:
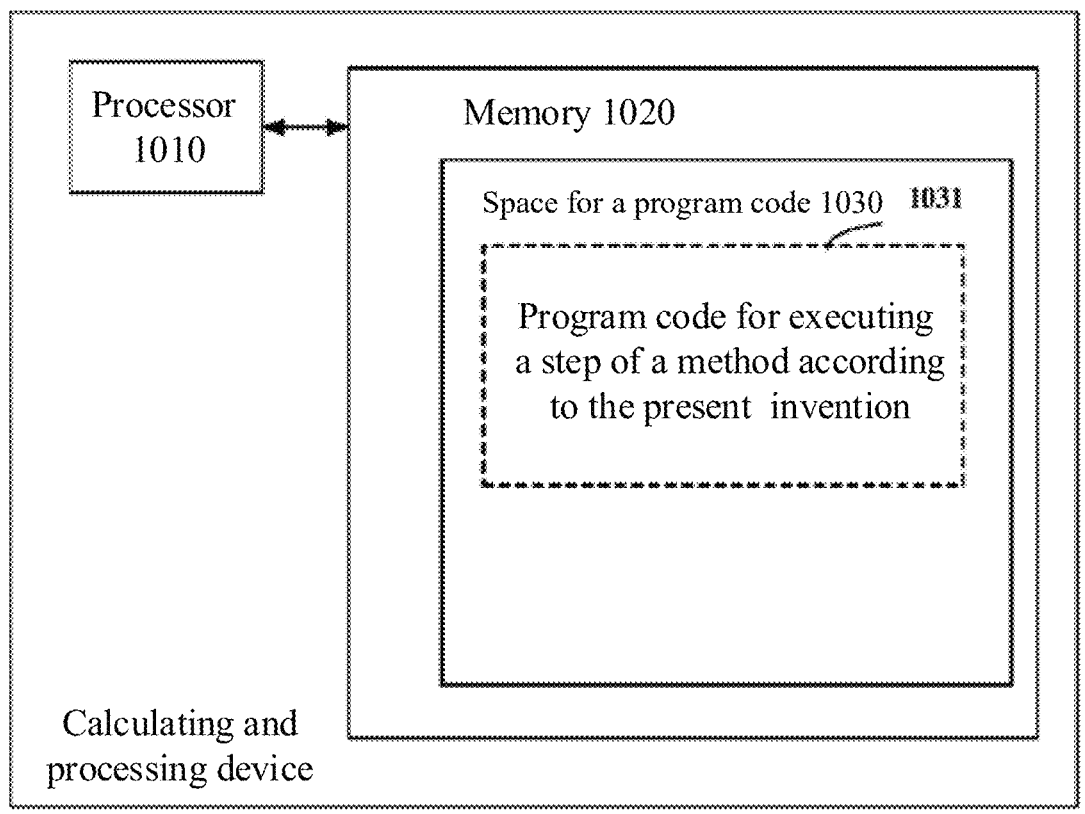
FIG. 20 schematically shows a block diagram of a computing processing device for executing a method according to the present disclosure.
Figure 21:
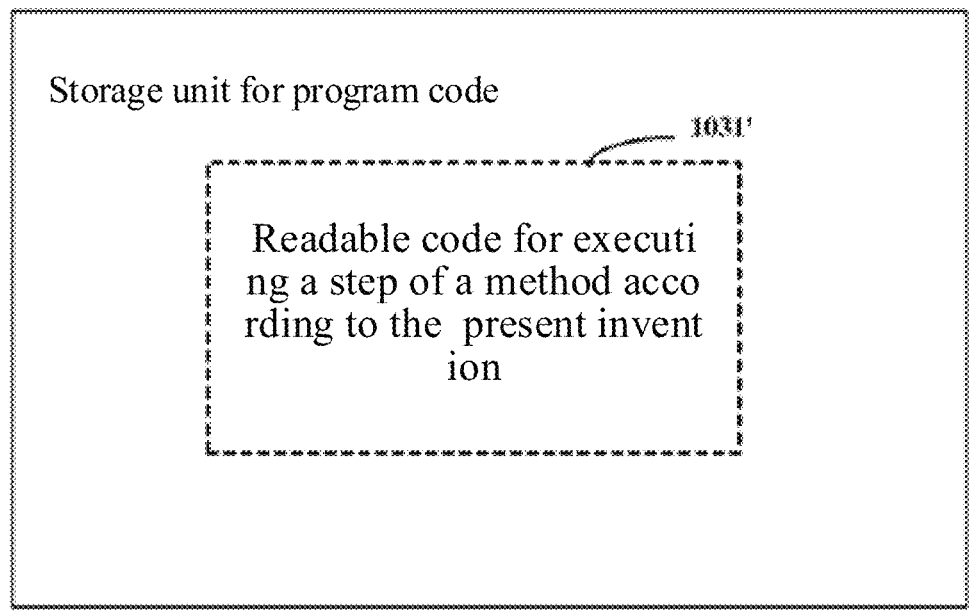
FIG. 21 schematically shows a memory unit for holding or carrying a program code implementing the method according to the present disclosure.

For example, FIG. 20 shows a computing processing device that may implement a method according to the present disclosure. The computing processing device conventionally includes a processor 1010 and a computer program product or computer-readable medium in the form of a memory 1020. The memory 1020 may be an electronic memory such as flash memory, EEPROM (electrically erasable programmable read-only memory), EPROM, hard disk, or ROM. The memory 1020 has a storage space 1030 for program code 1031 for performing any of the method Steps of the above method. For example, the storage space 1030 for the program code may include each program code 1031 for implementing various Steps in the above method, respectively. The program codes may be read from or written into one or more computer program products. These computer program products comprise a program code carrier such as a hard disk, a compact disc (CD), a memory card, or a floppy disk. Such a computer program product is usually a portable or fixed storage unit as described with reference to FIG. 21. The storage unit may have storage segments, storage space, etc. arranged similarly to the memory 1020 in the computing processing device of FIG. 20. The program code may, for example, be compressed in a suitable form. Generally, the storage unit includes a computer readable code 1031', i.e., a code that can be read by a processor, such as, for example,

1010. These codes, when run by a computing processing device, cause the computing processing device to perform the various Steps in the method described above.

It will be clear to a person skilled in the art that, for the convenience and brevity of the description, specific working procedures of the above-described systems, apparatuses, and units may be referred to the corresponding procedures in the preceding method embodiments and will not be described in detail here.

The above descriptions are only preferred embodiments of the present disclosure, and are not intended to limit the present disclosure. Any modifications, equivalent replacements, improvements, etc. made within the spirit and principles of the present disclosure shall be included in the scope of the present disclosure.

The above are only specific implementation modes of the present disclosure, and the scope of the present disclosure is not limited thereto. Any person skilled in the art can easily think of changes or substitutions within the technical scope disclosed by the present disclosure, which should be included within the scope of the present disclosure. Accordingly, the scope of the present disclosure should be subject to the scope of the claims.

The invention claimed is:

1. A reversing control method, wherein the method comprises:
acquiring a first reversing trajectory of a vehicle after receiving a reversing instruction for the vehicle; wherein the first reversing trajectory is pre-recorded before receiving the reversing instruction, which is an inverse trajectory of a forward trajectory within a preset time period or a preset distance of the vehicle, or a reversing trajectory planned according to a destination pointed by the reversing instruction when environmental obstacle information of the vehicle is pre-collected;
in response to the reversing instruction, controlling the vehicle to reverse according to the first reversing trajectory;
acquiring first environmental obstacle information of the vehicle in a reversing driving process;
determining whether a stationary first obstacle exists in the first environmental obstacle information according to the first reversing trajectory;
when the first obstacle exists, acquiring position information of the first obstacle and the real-time position information of the vehicle;
when the first environmental obstacle information reaches a preset condition, determining a second reversing trajectory of the vehicle according to the first reversing trajectory and the first environmental obstacle information, comprising: when the distance between the position information of the first obstacle and the real-time position information of the vehicle is less than or equal to a preset correction distance, determining a second reversing trajectory of the vehicle according to the position information of the first obstacle and the real-time position information of the vehicle; when the distance is greater than the preset correction distance, re-planning a new second reversing trajectory according to the position information of the first obstacle and the real-time position information of the vehicle, such that the vehicle bypasses the first obstacle during reversing; wherein the preset condition is a degree of change of the first environmental obstacle information in comparison with the environmental obstacle information when the first reversing trajectory is determined, and the degree of change is a degree of change of newly added or reduced obstacles, or a degree of change in positions and shapes of the obstacles; and
controlling the vehicle to reverse according to the second reversing trajectory.

2. The method according to claim 1, wherein after in response to the reversing instruction, controlling the vehicle to reverse according to the first reversing trajectory, further comprises:
acquiring real-time position information of the vehicle;
when the real-time position information deviates from the first reversing trajectory, determining a third reversing trajectory according to the first reversing trajectory and the real-time position information; and
controlling the vehicle to reverse according to the third reversing trajectory.

3. The method according to claim 1, wherein when the first environmental obstacle information reaches the preset condition, determining the second reversing trajectory of the vehicle according to the first reversing trajectory and the first environmental obstacle information comprises:
determining whether a moving second obstacle exists in the first environmental obstacle information according to the first reversing trajectory;
when the second obstacle exists, acquiring obstacle trajectory information of the second obstacle; and
determining a second reversing trajectory of the vehicle according to the obstacle trajectory information and the first reversing trajectory such that no overlapping position exists between the second reversing trajectory and the obstacle trajectory information.

4. The method according to claim 1, wherein before acquiring the first reversing trajectory of the vehicle after receiving the reversing instruction for the vehicle, further comprises:
when a traveling speed of the vehicle is less than or equal to a first speed, acquiring traveling route information of the vehicle and second environmental obstacle information; and
determining the first reversing trajectory of the vehicle according to the traveling route information and the second environmental obstacle information.

5. The method according to claim 4, wherein before acquiring the first reversing trajectory of the vehicle after receiving the reversing instruction for the vehicle, further comprises:
clearing the first reversing trajectory that is determined, when the traveling speed of the vehicle is greater than a second speed, and the second speed is greater than or equal to the first speed.

6. The method according to claim 1, wherein before determining the second reversing trajectory of the vehicle according to the position information of the first obstacle and the real-time position information of the vehicle, further comprises:
determining whether a second reversing trajectory exists according to the position information of the first obstacle and the real-time position information of the vehicle; and
controlling the vehicle to stop reversing when the second reversing trajectory does not exist.

7. The method according to claim 1, wherein after in response to the reversing instruction, controlling the vehicle to reverse according to the first reversing trajectory, further comprises:
prompting a real-time remaining distance of the first reversing trajectory during a reversing.

8. The method according to claim 1, wherein in response to the reversing instruction, controlling the vehicle to reverse according to the first reversing trajectory, comprises:
acquiring current steering wheel angle information of the vehicle, and controlling a steering wheel of the vehicle to steer to a target angle;
acquiring current gear information of the vehicle, and controlling a gear of the vehicle to switch to a target gear;
acquiring a current power output of an engine of the vehicle, and controlling the engine to switch to a target power output; and
acquiring a current driving state of the vehicle, and controlling a wheel braking force of the vehicle to switch to a target driving state;
wherein the target angle, the target gear, the target power output, and the target driving state are associated with the first reversing trajectory.

9. The method according to claim 1, wherein acquiring the first environmental obstacle information of the vehicle in the reversing driving process comprises:
acquiring the first environmental obstacle information of the vehicle by an ultrasonic sensor or an image sensor during the reversing driving process.

10. A reversing control system comprising:
one or more processors and a storage apparatus; and
the storage apparatus stores a computer program which, when executed by the processor, perform the operations comprising:
acquiring a first reversing trajectory of a vehicle after receiving a reversing instruction for the vehicle; wherein the first reversing trajectory is pre-recorded before receiving the reversing instruction, which is an inverse trajectory of a forward trajectory within a preset time period or a preset distance of the vehicle, or a reversing trajectory planned according to a destination pointed by the reversing instruction when environmental obstacle information of the vehicle is pre-collected;
in response to the reversing instruction, controlling the vehicle to reverse according to the first reversing trajectory;
acquiring first environmental obstacle information of the vehicle during a reversing driving process;
determining whether a stationary first obstacle exists in the first environmental obstacle information according to the first reversing trajectory;
when the first obstacle exists, acquiring position information of the first obstacle and the real-time position information of the vehicle;
when the first environmental obstacle information reaches a preset condition, determining a second reversing trajectory of the vehicle according to the first reversing trajectory and the first environmental obstacle information, comprising: when the distance between the position information of the first obstacle and the real-time position information of the vehicle is less than or equal to a preset correction distance, determining a second reversing trajectory of the vehicle according to the position information of the first obstacle and the real-time position information of the vehicle; when the distance is greater than the preset correction distance, re-planning a new second reversing trajectory according to the position information of the first obstacle and the real-time position information of the vehicle, such that the vehicle bypasses the first obstacle during reversing; wherein the preset condition is a degree of change of the first environmental obstacle information in comparison with the environmental obstacle information when the first reversing trajectory is determined, and the degree of change is a degree of change of newly added or reduced obstacles, or a degree of change in positions and shapes of the obstacles; and
controlling the vehicle to reverse according to the second reversing trajectory.

11. A vehicle comprising a system that implements the reversing control method according to claim 1.

12. A non-transitory computer-readable medium, wherein the non-transitory computer-readable medium stores a computer-readable code, and when the computer-readable code is executed, the reversing control method according to claim 1 is performed.

* * * * *